United States Patent
Westerman

(10) Patent No.: US 10,747,428 B2
(45) Date of Patent: Aug. 18, 2020

(54) SELECTIVE REJECTION OF TOUCH CONTACTS IN AN EDGE REGION OF A TOUCH SURFACE

(71) Applicant: Apple Inc., Cupertino, CA (US)

(72) Inventor: Wayne Carl Westerman, Burlingame, CA (US)

(73) Assignee: Apple Inc., Cupertino, CA (US)

( * ) Notice: Subject to any disclaimer, the term of this patent is extended or adjusted under 35 U.S.C. 154(b) by 99 days.

(21) Appl. No.: 15/880,362

(22) Filed: Jan. 25, 2018

(65) Prior Publication Data

US 2018/0150152 A1 May 31, 2018

Related U.S. Application Data

(63) Continuation of application No. 14/711,626, filed on May 13, 2015, now Pat. No. 9,891,732, which is a
(Continued)

(51) Int. Cl.
*G06F 3/0488* (2013.01)
*G06F 3/0354* (2013.01)
(Continued)

(52) U.S. Cl.
CPC ...... *G06F 3/04886* (2013.01); *G06F 3/03547* (2013.01); *G06F 3/0418* (2013.01);
(Continued)

(58) Field of Classification Search
CPC .. G06F 3/044; G06F 3/04883; G06F 3/04886; G06F 3/0416
(Continued)

(56) References Cited

U.S. PATENT DOCUMENTS 4,346,376 A 8/1982 Mallos
4,477,797 A 10/1984 Nakagiri
(Continued)

FOREIGN PATENT DOCUMENTS

CN 1818840 A 8/2006
EP 1 691 263 A1 8/2006
(Continued)

OTHER PUBLICATIONS

Final Office Action dated Nov. 8, 2018, for U.S. Appl. No. 15/805,954, filed Nov. 7, 2017, 26 pages.
(Continued)

*Primary Examiner* — Patrick F Marinelli
(74) *Attorney, Agent, or Firm* — Kubota & Basol LLP

(57) ABSTRACT

The selective rejection of touch contacts in an edge region of a touch sensor panel is disclosed. In addition, by providing certain exceptions to the rejection of edge contacts, the functionality of the touch sensor panel can be maximized. Contacts in edge bands around the perimeter of a touch sensor panel can be ignored. However, if a contact in the edge band moves beyond a threshold distance or speed, it can be recognized as part of a gesture. To accommodate different finger sizes, the size of the edge band can be modified based on the identification of the finger or thumb. Furthermore, if contacts in the center region of a touch sensor panel track the movement of contacts in the edge band, the contacts in the edge band can be recognized as part of a gesture.

12 Claims, 14 Drawing Sheets

Related U.S. Application Data continuation of application No. 13/250,955, filed on Sep. 30, 2011, now Pat. No. 9,041,663, which is a continuation of application No. 12/242,772, filed on Sep. 30, 2008, now abandoned.

(60) Provisional application No. 61/019,220, filed on Jan. 4, 2008.

(51) Int. Cl.
  *G06F 3/041* (2006.01)
  *G06F 3/044* (2006.01)

(52) U.S. Cl.
  CPC ........ *G06F 3/0488* (2013.01); *G06F 3/04883* (2013.01); *G06F 3/044* (2013.01); *G06F 3/0416* (2013.01); *G06F 2203/04104* (2013.01); *G06F 2203/04105* (2013.01); *G06F 2203/04106* (2013.01); *G06F 2203/04808* (2013.01)

(58) Field of Classification Search
  USPC ........... 345/156–184, 104; 178/18.01–20.04; 715/863
  See application file for complete search history.

(56) References Cited

U.S. PATENT DOCUMENTS

| | | | |
|---|---|---|---|
| 4,658,690 A | 4/1987 | Aitken et al. | |
| 4,731,058 A | 3/1988 | Doan | |
| 4,797,514 A | 1/1989 | Talmage, Jr. et al. | |
| 5,053,758 A | 10/1991 | Cornett et al. | |
| 5,070,467 A * | 12/1991 | Todome | G03G 15/5016 345/173 |
| 5,119,079 A * | 6/1992 | Hube | G03G 15/5016 345/173 |
| 5,426,450 A | 6/1995 | Drumm | |
| 5,434,757 A | 7/1995 | Kashiwagi | |
| 5,481,278 A | 1/1996 | Shigematsu et al. | |
| 5,483,261 A | 1/1996 | Yasutake | |
| 5,488,204 A | 1/1996 | Mead et al. | |
| 5,495,077 A | 2/1996 | Miller et al. | |
| 5,541,372 A | 7/1996 | Baller et al. | |
| 5,563,632 A | 10/1996 | Roberts | |
| 5,591,945 A | 1/1997 | Kent | |
| 5,757,361 A * | 5/1998 | Hirshik | G06F 3/0488 178/18.03 |
| 5,764,218 A | 6/1998 | Della Bona et al. | |
| 5,767,457 A | 6/1998 | Gerpheide et al. | |
| 5,821,922 A | 10/1998 | Sellers | |
| 5,825,352 A * | 10/1998 | Bisset | G06F 3/044 345/173 |
| 5,835,079 A | 11/1998 | Shieh | |
| 5,856,822 A | 1/1999 | Du et al. | |
| 5,864,334 A | 1/1999 | Sellers | |
| 5,880,411 A | 3/1999 | Gillespie et al. | |
| 5,943,052 A | 8/1999 | Allen et al. | |
| 5,963,671 A | 10/1999 | Comerford et al. | |
| 5,996,080 A | 11/1999 | Silva et al. | |
| 6,002,389 A | 12/1999 | Kasser | |
| 6,073,120 A | 6/2000 | Shiota et al. | |
| 6,118,435 A | 9/2000 | Fujita et al. | |
| 6,154,210 A | 11/2000 | Anderson | |
| 6,188,391 B1 | 2/2001 | Seely et al. | |
| 6,216,988 B1 | 4/2001 | Hsu et al. | |
| 6,243,080 B1 | 6/2001 | Molne | |
| 6,246,395 B1 * | 6/2001 | Goyins | G06F 3/0488 345/173 |
| 6,266,050 B1 | 7/2001 | Oh et al. | |
| 6,310,610 B1 | 10/2001 | Beaton et al. | |
| 6,323,846 B1 * | 11/2001 | Westerman | G06F 3/0235 345/173 |
| 6,336,614 B1 | 1/2002 | Kwitek | |
| 6,337,678 B1 | 1/2002 | Fish | |
| 6,369,803 B2 | 4/2002 | Brisebois et al. | |
| 6,380,931 B1 * | 4/2002 | Gillespie | G06F 3/03547 178/18.01 |
| 6,424,338 B1 * | 7/2002 | Anderson | G06F 3/0213 178/18.01 |
| 6,452,514 B1 | 9/2002 | Philipp | |
| 6,459,424 B1 * | 10/2002 | Resman | G06F 3/044 345/173 |
| 6,492,979 B1 | 12/2002 | Kent et al. | |
| 6,501,462 B1 | 12/2002 | Garner | |
| 6,504,530 B1 | 1/2003 | Wilson et al. | |
| 6,560,612 B1 | 5/2003 | Yamada et al. | |
| 6,573,844 B1 * | 6/2003 | Venolia | G06F 3/0237 341/22 |
| 6,610,936 B2 | 8/2003 | Gillespie et al. | |
| 6,611,253 B1 | 8/2003 | Cohen | |
| 6,654,001 B1 | 11/2003 | Su | |
| 6,690,387 B2 | 2/2004 | Zimmerman et al. | |
| 6,747,636 B2 | 6/2004 | Martin | |
| 6,756,971 B1 | 6/2004 | Ramey et al. | |
| 6,765,557 B1 | 7/2004 | Segal et al. | |
| 6,819,312 B2 | 11/2004 | Fish | |
| 6,943,705 B1 | 9/2005 | Bolender et al. | |
| 6,943,779 B2 | 9/2005 | Satoh et al. | |
| 6,958,749 B1 | 10/2005 | Matsushita et al. | |
| 6,982,695 B1 | 1/2006 | Canova et al. | |
| 7,015,894 B2 | 3/2006 | Morohoshi | |
| 7,038,659 B2 | 5/2006 | Rajkowski | |
| 7,046,230 B2 | 5/2006 | Zadesky et al. | |
| 7,088,347 B2 | 8/2006 | Iisaka et al. | |
| 7,103,852 B2 * | 9/2006 | Kairis, Jr. | G06F 3/0418 345/173 |
| 7,148,882 B2 | 12/2006 | Kamrath et al. | |
| 7,176,902 B2 | 2/2007 | Peterson et al. | |
| 7,184,064 B2 | 2/2007 | Zimmerman et al. | |
| 7,277,087 B2 | 10/2007 | Hill et al. | |
| 7,289,111 B2 | 10/2007 | Asbill | |
| 7,298,364 B2 | 11/2007 | Matsuda | |
| 7,345,670 B2 | 3/2008 | Armstrong | |
| 7,406,666 B2 * | 7/2008 | Davis | G06F 1/1626 345/173 |
| 7,408,538 B2 * | 8/2008 | Hinckley | G06F 3/03547 345/173 |
| 7,499,040 B2 | 3/2009 | Zadesky et al. | |
| 7,561,146 B1 * | 7/2009 | Hotelling | G06F 3/0304 345/168 |
| 7,564,448 B2 | 7/2009 | Yi | |
| 7,609,178 B2 | 10/2009 | Son et al. | |
| 7,633,076 B2 | 12/2009 | Huppi et al. | |
| 7,639,233 B2 | 12/2009 | Marks | |
| 7,663,607 B2 | 2/2010 | Hotelling et al. | |
| 7,746,325 B2 | 6/2010 | Roberts | |
| 7,834,855 B2 | 11/2010 | Hotelling et al. | |
| 7,843,427 B2 | 11/2010 | Ording et al. | |
| 7,852,199 B2 | 12/2010 | Desai et al. | |
| 7,855,718 B2 * | 12/2010 | Westerman | G06F 3/0418 345/173 |
| 7,876,310 B2 * | 1/2011 | Westerman | G06K 9/00375 345/173 |
| 7,911,455 B2 | 3/2011 | Nishikawa et al. | |
| 7,934,156 B2 | 4/2011 | Forstall et al. | |
| 7,944,215 B2 | 5/2011 | Howard et al. | |
| 7,956,849 B2 | 6/2011 | Anzures et al. | |
| 7,986,307 B2 | 7/2011 | Zotov et al. | |
| 8,072,439 B2 | 12/2011 | Hillis et al. | |
| 8,098,233 B2 | 1/2012 | Hotelling et al. | |
| 8,174,508 B2 | 5/2012 | Sinclair et al. | |
| 8,232,973 B2 * | 7/2012 | Kocienda | G06F 3/0237 345/168 |
| 8,253,698 B2 | 8/2012 | Chen et al. | |
| 8,284,165 B2 * | 10/2012 | Koshiyama | G06F 3/0412 345/173 |
| 8,294,047 B2 | 10/2012 | Westerman et al. | |
| 8,321,809 B2 * | 11/2012 | Eom | G06F 3/04886 345/173 |
| 8,411,060 B1 * | 4/2013 | Scholler | G06F 3/04883 345/173 |

(56) References Cited

U.S. PATENT DOCUMENTS

| | | | |
|---|---|---|---|
| 8,445,793 B2 | 5/2013 | Westerman et al. | |
| 8,446,375 B2* | 5/2013 | Yasumi | G06F 3/04883 345/156 |
| 8,479,122 B2 | 7/2013 | Hotelling et al. | |
| 8,654,095 B1* | 2/2014 | Cho | G06F 3/0412 345/173 |
| 8,698,750 B2 | 4/2014 | Malabuyo | |
| 8,701,049 B2* | 4/2014 | Kim | G06F 3/04886 715/863 |
| 8,749,507 B2 | 6/2014 | DaCosta et al. | |
| 8,847,903 B2* | 9/2014 | Stokes | G06F 3/04883 345/156 |
| 8,896,561 B1* | 11/2014 | Engel | G06F 3/0416 178/18.03 |
| 8,952,899 B2 | 2/2015 | Hotelling | |
| 8,970,533 B2 | 3/2015 | Westerman et al. | |
| 9,041,663 B2* | 5/2015 | Westerman | G06F 3/041 345/173 |
| 9,116,583 B1* | 8/2015 | De Los Reyes | G06F 3/044 |
| 9,189,142 B2* | 11/2015 | Kim | G06F 3/044 |
| 9,285,913 B1* | 3/2016 | Kang | G06F 3/0412 |
| 9,285,988 B2* | 3/2016 | Kenney | G06F 3/04886 |
| 9,423,995 B2* | 8/2016 | Arneson | G06F 3/011 |
| 9,513,673 B2 | 12/2016 | Hotelling | |
| 9,632,608 B2 | 4/2017 | Westerman et al. | |
| 9,891,732 B2* | 2/2018 | Westerman | G06F 3/0418 |
| 2002/0015024 A1 | 2/2002 | Westerman et al. | |
| 2002/0080123 A1 | 6/2002 | Kennedy et al. | |
| 2002/0158838 A1 | 10/2002 | Smith et al. | |
| 2003/0095095 A1 | 5/2003 | Pihlaja | |
| 2003/0122787 A1 | 7/2003 | Zimmerman et al. | |
| 2003/0137497 A1 | 7/2003 | Kojo et al. | |
| 2003/0206162 A1 | 11/2003 | Roberts | |
| 2003/0216890 A1 | 11/2003 | Gross et al. | |
| 2004/0012572 A1 | 1/2004 | Sowden et al. | |
| 2004/0036680 A1* | 2/2004 | Davis | G06F 1/1626 345/169 |
| 2004/0046791 A1* | 3/2004 | Davis | G06F 1/1626 715/762 |
| 2004/0066379 A1 | 4/2004 | Ise et al. | |
| 2004/0104894 A1 | 6/2004 | Tsukada et al. | |
| 2004/0108994 A1 | 6/2004 | Kato | |
| 2004/0119744 A1 | 6/2004 | Chan | |
| 2004/0178994 A1* | 9/2004 | Kairls, Jr. | G06F 3/0418 345/173 |
| 2004/0207605 A1 | 10/2004 | Mackey et al. | |
| 2004/0227736 A1 | 11/2004 | Kamrath et al. | |
| 2004/0233624 A1 | 11/2004 | Aisenberg | |
| 2005/0012723 A1* | 1/2005 | Pallakoff | G06F 1/1616 345/173 |
| 2005/0024341 A1 | 2/2005 | Gillespie et al. | |
| 2005/0052425 A1 | 3/2005 | Zadesky et al. | |
| 2005/0078093 A1 | 4/2005 | Peterson et al. | |
| 2005/0104867 A1 | 5/2005 | Westerman et al. | |
| 2005/0146512 A1 | 7/2005 | Hill et al. | |
| 2005/0162406 A1 | 7/2005 | Ono et al. | |
| 2005/0184696 A1 | 8/2005 | Anastas et al. | |
| 2005/0243053 A1 | 11/2005 | Liess et al. | |
| 2006/0022956 A1 | 2/2006 | Lengeling et al. | |
| 2006/0026521 A1* | 2/2006 | Hotelling | G06F 3/0418 715/702 |
| 2006/0033701 A1 | 2/2006 | Wilson | |
| 2006/0038796 A1 | 2/2006 | Hinckley et al. | |
| 2006/0044259 A1* | 3/2006 | Hotelling | G06F 1/1616 345/156 |
| 2006/0050059 A1 | 3/2006 | Satoh et al. | |
| 2006/0052885 A1 | 3/2006 | Kong | |
| 2006/0066588 A1 | 3/2006 | Lyon et al. | |
| 2006/0071915 A1* | 4/2006 | Rehm | G06F 1/1616 345/173 |
| 2006/0109252 A1* | 5/2006 | Kolmykov-Zotov | G06F 3/03545 345/173 |
| 2006/0181517 A1 | 8/2006 | Zadesky et al. | |
| 2006/0197753 A1 | 9/2006 | Hotelling | |
| 2006/0228149 A1 | 10/2006 | Harley | |
| 2006/0238517 A1* | 10/2006 | King | G06F 1/1626 345/173 |
| 2006/0238522 A1 | 10/2006 | Westerman et al. | |
| 2006/0256090 A1 | 11/2006 | Huppi | |
| 2006/0284836 A1 | 12/2006 | Philipp | |
| 2007/0002192 A1 | 1/2007 | Nishino et al. | |
| 2007/0015976 A1 | 1/2007 | Miesel et al. | |
| 2007/0046643 A1 | 3/2007 | Hillis | |
| 2007/0075965 A1 | 4/2007 | Huppi et al. | |
| 2007/0146334 A1 | 6/2007 | Inokawa | |
| 2007/0150842 A1* | 6/2007 | Chaudhri | G06F 3/04883 715/863 |
| 2007/0152976 A1* | 7/2007 | Townsend | G06F 3/0416 345/173 |
| 2007/0152983 A1 | 7/2007 | McKillop et al. | |
| 2007/0182722 A1* | 8/2007 | Hotelling | G06F 1/1616 345/173 |
| 2007/0247429 A1 | 10/2007 | Westerman | |
| 2007/0247435 A1 | 10/2007 | Benko et al. | |
| 2007/0262968 A1 | 11/2007 | Kazuhito et al. | |
| 2007/0268275 A1 | 11/2007 | Westerman et al. | |
| 2007/0273665 A1* | 11/2007 | Park | G06F 3/0416 345/173 |
| 2008/0001924 A1* | 1/2008 | de los Reyes | G06F 3/04886 345/173 |
| 2008/0012835 A1* | 1/2008 | Rimon | G06F 3/038 345/173 |
| 2008/0012838 A1 | 1/2008 | Rimon | |
| 2008/0036743 A1* | 2/2008 | Westerman | G06F 3/038 345/173 |
| 2008/0040692 A1* | 2/2008 | Sunday | G06F 3/04883 715/863 |
| 2008/0062144 A1 | 3/2008 | Shahoian et al. | |
| 2008/0082920 A1* | 4/2008 | Eom | G06F 3/04886 715/702 |
| 2008/0122798 A1* | 5/2008 | Koshiyama | G06F 3/0412 345/173 |
| 2008/0136788 A1 | 6/2008 | Nishikawa et al. | |
| 2008/0136792 A1* | 6/2008 | Peng | G06F 3/0416 345/174 |
| 2008/0158145 A1 | 7/2008 | Westerman | |
| 2008/0158172 A1 | 7/2008 | Hotelling et al. | |
| 2008/0158181 A1 | 7/2008 | Hamblin et al. | |
| 2008/0158185 A1 | 7/2008 | Westerman | |
| 2008/0165141 A1* | 7/2008 | Christie | G06F 3/044 345/173 |
| 2008/0192026 A1 | 8/2008 | Mackey et al. | |
| 2008/0196945 A1 | 8/2008 | Konstas | |
| 2008/0202824 A1 | 8/2008 | Philipp et al. | |
| 2008/0291225 A1* | 11/2008 | Arneson | G06F 3/011 345/698 |
| 2008/0309632 A1* | 12/2008 | Westerman | G06F 3/038 345/173 |
| 2009/0005165 A1 | 1/2009 | Arezina et al. | |
| 2009/0015564 A1 | 1/2009 | Ye et al. | |
| 2009/0085881 A1* | 4/2009 | Keam | G06F 3/0416 345/173 |
| 2009/0095540 A1* | 4/2009 | Zachut | G06F 3/044 178/18.03 |
| 2009/0101417 A1 | 4/2009 | Suzuki et al. | |
| 2009/0141046 A1* | 6/2009 | Rathnam | G06F 3/03547 345/661 |
| 2009/0160785 A1* | 6/2009 | Chen | G06F 3/04883 345/173 |
| 2009/0160802 A1* | 6/2009 | Yasumi | G06F 3/04883 345/173 |
| 2009/0167692 A1* | 7/2009 | Tan | G06F 3/0202 345/168 |
| 2009/0174667 A1* | 7/2009 | Kocienda | G06F 3/0237 345/169 |
| 2009/0174679 A1* | 7/2009 | Westerman | G06F 3/0416 345/173 |
| 2009/0237372 A1* | 9/2009 | Kim | G06F 3/044 345/173 |
| 2009/0244092 A1 | 10/2009 | Hotelling | |

(56) References Cited

U.S. PATENT DOCUMENTS

| | | |
|---|---|---|
| 2009/0256817 A1 | 10/2009 | Perlin et al. |
| 2009/0284495 A1 | 11/2009 | Geaghan et al. |
| 2009/0322351 A1 | 12/2009 | McLeod |
| 2009/0327977 A1* | 12/2009 | Bachfischer ............ B60K 35/00 715/863 |
| 2010/0039380 A1 | 2/2010 | Lanier |
| 2010/0073302 A1* | 3/2010 | Ritzau ................... G06F 3/0233 345/173 |
| 2010/0099394 A1 | 4/2010 | Hainzl |
| 2010/0141580 A1 | 6/2010 | Oh |
| 2010/0141603 A1 | 6/2010 | Hotelling |
| 2010/0261526 A1 | 10/2010 | Anderson et al. |
| 2010/0318930 A1 | 12/2010 | Townsend et al. |
| 2011/0037735 A1* | 2/2011 | Land ...................... G06F 3/0418 345/178 |
| 2011/0088086 A1* | 4/2011 | Swink .................. G06F 3/04883 726/7 |
| 2011/0163996 A1 | 7/2011 | Wassvik et al. |
| 2011/0258542 A1* | 10/2011 | Kenney ............... G06F 3/04886 715/702 |
| 2012/0019468 A1* | 1/2012 | Westerman ............. G06F 3/017 345/173 |
| 2012/0023459 A1* | 1/2012 | Westerman ......... G06F 3/03547 715/863 |
| 2013/0222220 A1* | 8/2013 | Tobita ................... G09G 3/3677 345/100 |
| 2014/0109017 A1 | 4/2014 | Benko et al. |
| 2014/0111486 A1* | 4/2014 | Zay ....................... G06F 3/0488 345/178 |
| 2015/0253872 A1* | 9/2015 | Reyes ..................... G06F 3/044 345/157 |
| 2015/0253891 A1* | 9/2015 | Westerman ......... G06F 3/03547 345/173 |
| 2015/0293633 A1* | 10/2015 | Ray ....................... G06F 3/0488 345/173 |
| 2017/0068346 A1 | 3/2017 | Hotelling |
| 2017/0220165 A1 | 8/2017 | Westerman et al. |
| 2018/0067571 A1 | 3/2018 | Hotelling et al. |

FOREIGN PATENT DOCUMENTS

| | | |
|---|---|---|
| GB | 2 344 894 A | 6/2000 |
| GB | 2 402 105 A | 12/2004 |
| JP | 61-075981 A | 4/1986 |
| JP | 05-257594 A | 10/1993 |
| JP | 06-149466 A | 5/1994 |
| JP | 06-289969 A | 10/1994 |
| JP | 07-073278 A | 3/1995 |
| JP | 09-044293 A | 2/1997 |
| JP | 10-003349 A | 1/1998 |
| JP | 10-289061 A | 10/1998 |
| JP | 10-293644 A | 11/1998 |
| JP | 11-194883 A | 7/1999 |
| JP | 11-327788 A | 11/1999 |
| JP | 2000-039964 A | 2/2000 |
| JP | 2000-163031 A | 6/2000 |
| JP | 2000-163211 A | 6/2000 |
| JP | 2000-172441 A | 6/2000 |
| JP | 2000-194507 A | 7/2000 |
| JP | 2001-265519 A | 9/2001 |
| JP | 2001-290585 A | 10/2001 |
| JP | 2002-287889 A | 10/2002 |
| JP | 2002-287903 A | 10/2002 |
| JP | 2002-342033 A | 11/2002 |
| JP | 2003-173237 A | 6/2003 |
| JP | 2003-530772 A | 10/2003 |
| JP | 2005-082086 A | 3/2005 |
| JP | 2006-034754 A | 2/2006 |
| JP | 2006-512626 A | 4/2006 |
| JP | 2007-512619 A | 5/2007 |
| JP | 2007-242035 A | 9/2007 |
| JP | 2007-304757 A | 11/2007 |
| JP | 2008-140182 A | 6/2008 |
| JP | 2008-234212 A | 10/2008 |
| KR | 2004-0103125 A | 12/2004 |
| WO | WO-92/11623 A1 | 7/1992 |
| WO | WO-98/43202 A1 | 10/1998 |
| WO | WO-2004/025449 A2 | 3/2004 |
| WO | WO-2004/025449 A3 | 3/2004 |
| WO | WO-2006/026183 A2 | 3/2006 |
| WO | WO-2006/026183 A3 | 3/2006 |
| WO | WO-2007/076226 A1 | 7/2007 |
| WO | WO-2007/039766 A2 | 8/2007 |
| WO | WO-2007/089766 A3 | 8/2007 |
| WO | WO-2008/094791 A2 | 8/2008 |
| WO | WO-2008/094791 A3 | 8/2008 |
| WO | WO-2009/088672 A2 | 7/2009 |
| WO | WO-2009/088672 A3 | 7/2009 |

OTHER PUBLICATIONS

Final Office Action dated Nov. 26, 2018, for U.S. Appl. No. 15/354,931, filed Nov. 17, 2016, 27 pages.
Non-Final Office Action dated Mar. 1, 2018, for U.S. Appl. No. 15/354,931, filed Nov. 17, 2016, 25 pages.
Non-Final Office Action dated Mar. 8, 2018, for U.S. Appl. No. 15/805,954, filed Nov. 7, 2017, 39 pages.
Final Office Action dated Jan. 11, 2019, for U.S. Appl. No. 15/489,646, filed Apr. 17, 2017, 14 pages.
Non-Final Office Action dated May 9, 2018, for U.S. Appl. No. 15/489,646, filed Apr. 17, 2017, 29 pages.
Apple Computer, Inc., "Block Diagram and Buses" Apple Developer Connection, Aug. 3, 2004 downloaded from the Internet from http://developer.apple.com/documentation/Hardware/Developer_Notes/Macintosh_CPUs-G . . . (4 pages).
Apple Computer, Inc., "Powerbook G4" Technology Overview, Apr. 2004 (29 pages).
Chinese Search Report dated Jan. 19, 2016, for CN Application No. 201310489261.x, with English translation, four pages.
Communication for EP Patent Application No. 05788888.5-2224, dated Sep. 4, 2007, 2 pages.
Communication for EP Patent Application No. 05788888.5-2224, dated Sep. 1, 2008, 3 pages.
European Search Report dated Dec. 10, 2009, for EP Application No. 08022346.4, filed Dec. 23, 2008, ten pages.
European Search Report dated Apr. 24, 2012, for EP Application No. 12160763.4, filed Dec. 23, 2008, nine pages.
European Search Report dated Nov. 2, 2015, for EP Application No. 15164429.1, four pages.
Final Office Action dated Feb. 5, 2008, for U.S. Appl. No. 11/731,118, filed Mar. 30, 2007, nine pages.
Final Office Action dated Feb. 20, 2008, for U.S. Appl. No. 10/927,577, filed Aug. 25, 2004, 11 pages.
Final Office Action dated Mar. 26, 2008, for U.S. Appl. No. 10/927,575, filed Aug. 25, 2004, 25 pages.
Final Office Action dated Mar. 4, 2009, for U.S. Appl. No. 11/731,118, filed Mar. 30, 2007, eight pages.
Final Office Action dated Mar. 5, 2009, for U.S. Appl. No. 10/927,575, filed Aug. 25, 2004, 16 pages.
Final Office Action dated Jan. 25, 2010, for U.S. Appl. No. 11/731,118, filed Mar. 30, 2007, nine pages.
Final Office Action dated Mar. 2, 2010, for U.S. Appl. No. 10/927,575, filed Aug. 25, 2004, 16 pages.
Final Office Action dated Sep. 16, 2010, for U.S. Appl. No. 12/479,741, filed Aug. 25, 2004, 11 pages.
Final Office Action dated Feb. 24, 2012, for U.S. Appl. No. 13/250,955, filed Sep. 30, 2011, 29 pages.
Final Office Action dated Mar. 22, 2012, for U.S. Appl. No. 13/251,013, filed Sep. 30, 2011, 18 pages.
Final Office Action dated Apr. 12, 2012, for U.S. Appl. No. 12/242,772, filed Sep. 30, 2008, 24 pages.
Final Office Action dated Jul. 27, 2012, for U.S. Appl. No. 12/479,741, filed Jun. 5, 2009, 14 pages.
Final Office Action dated Oct. 12, 2012, for U.S. Appl. No. 13/351,096, filed Jan. 16, 2012, 17 pages.

(56) References Cited

OTHER PUBLICATIONS

Final Office Action dated Feb. 14, 2013, for U.S. Appl. No. 12/242,772, filed Sep. 30, 2008, 32 pages.
Final Office Action dated Feb. 13, 2014, for U.S. Appl. No. 12/479,741, filed Jun. 5, 2009, 15 pages.
Final Office Action dated Mar. 27, 2014, for U.S. Appl. No. 13/250,955, filed Sep. 30, 2011, 28 pages.
Final Office Action dated Jul. 24, 2014, for U.S. Appl. No. 13/868,787, filed Apr. 23, 2013, 10 pages.
Final Office Action dated May 20, 2016, for U.S. Appl. No. 14/619,958, filed Feb. 11, 2015, 30 pages.
Final Office Action dated Oct. 24, 2016, for U.S. Appl. No. 14/711,626, filed May 13, 2015, 14 pages.
GB Combined Examination and Search Report dated Nov. 26, 2010, for GB Application No. 1018237.6, filed Dec. 18, 2008, six pages.
GB Search Report dated Feb. 17, 2009, for GB Application No. 0823047.6, filed Dec. 18, 2008, two pages.
International Search Report dated Dec. 30, 2009, for PCT/US2008/087041, filed Dec. 16, 2008, six pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Non-Final Office Action dated Aug. 22, 2007, for U.S. Appl. No. 10/927,575, filed Aug. 25, 2004, 21 pages.
Non-Final Office Action dated Aug. 22, 2007, for U.S. Appl. No. 11/731,118, filed Mar. 30, 2007, seven pages.
Non-Final Office Action dated Sep. 10, 2007, for U.S. Appl. No. 10/927,577, filed Aug. 25, 2004, 10 pages.
Non-Final Office Action dated Jul. 24, 2008, for U.S. Appl. No. 11/731,118, filed Mar. 30, 2007, 14 pages.
Non-Final Office Action dated Jul. 31, 2008, for U.S. Appl. No. 10/927,577, filed Aug. 25, 2004, 11 pages.
Non-Final Office Action dated Sep. 17, 2008, for U.S. Appl. No. 10/927,575, filed Aug. 25, 2004, 14 pages.
Non-Final Office Action dated Aug. 3, 2009, for U.S. Appl. No. 11/731,118, filed Mar. 30, 2007, 10 pages.
Non-Final Office Action dated Sep. 1, 2009, for U.S. Appl. No. 10/927,575, filed Aug. 25, 2004, 17 pages.
Non-Final Office Action dated Apr. 1, 2010, for U.S. Appl. No. 12/479,741, filed Aug. 25, 2004, 12 pages.
Non-Final Office Action dated Oct. 12, 2011, for U.S. Appl. No. 12/242,772, filed Sep. 30, 2008, 19 pages.
Non-Final Office Action dated Nov. 9, 2011, for U.S. Appl. No. 13/250,955, filed Sep. 30, 2011, 32 pages.
Non-Final Office Action dated Nov. 17, 2011, for U.S. Appl. No. 13/251,013, filed Sep. 30, 2011, 13 pages.
Non-Final Office Action dated Jan. 4, 2012, for U.S. Appl. No. 12/479,741, filed Aug. 25, 2004, 17 pages.
Non-Final Office Action dated Feb. 6, 2012, for U.S. Appl. No. 12/691,702, filed Jan. 21, 2010, 13 pages.
Non-Final Office Action dated Feb. 24, 2012, for U.S. Appl. No. 12/242,794, filed Dec. 8, 2008, seven pages.
Non-Final Office Action dated Feb. 29, 2012, for U.S. Appl. No. 13/351,096, filed Jan. 16, 2012, 27 pages.
Non-Final Office Action dated Sep. 12, 2012, for U.S. Appl. No. 13/251,013, filed Sep. 30, 2011, 22 pages.
Non-Final Office Action dated Oct. 11, 2012, for U.S. Appl. No. 12/242,772, filed Sep. 30, 2008, 19 pages.
Non-Final Office Action dated Jul. 22, 2013, for U.S. Appl. No. 13/351,096, filed Jan. 16, 2012, 11 pages.
Non-Final Office Action dated Sep. 25, 2013, for U.S. Appl. No. 13/868,787, filed Apr. 23, 2013, 20 pages.
Non-Final Office Action dated Nov. 14, 2013, for U.S. Appl. No. 13/250,955, filed Sep. 30, 2011, 27 pages.
Non-Final Office Action dated Feb. 21, 2014, for U.S. Appl. No. 13/868,787, filed Apr. 23, 2013, 20 pages.
Non-Final Office Action dated Nov. 5, 2015, for U.S. Appl. No. 14/619,958, filed Feb. 11, 2015, 20 pages.
Non-Final Office Action dated Apr. 14, 2016, for U.S. Appl. No. 14/711,626, filed May 13, 2015, 13 pages.
Non-Final Office Action dated Apr. 19, 2017, for U.S. Appl. No. 14/711,626, filed May 13, 2015, 16 pages.
Notice of Allowance dated Mar. 6, 2009, for U.S. Appl. No. 10/927,577, filed Aug. 25, 2004, seven pages.
Notice of Allowance dated Jul. 12, 2010, for U.S. Appl. No. 10/927,575, filed Aug. 25, 2004, four pages.
Notice of Allowance dated Sep. 14, 2011, for U.S. Appl. No. 11/731,118, filed Mar. 30, 2007, seven pages.
Notice of Allowance dated Jun. 26, 2012, for U.S. Appl. No. 12/242,794, filed Dec. 8, 2008, 10 pages.
Notice of Allowance dated Jan. 24, 2013, for U.S. Appl. No. 13/251,013, filed Sep. 30, 2011, nine pages.
Notice of Allowance dated Oct. 1, 2014, for U.S. Appl. No. 12/479,741, filed Jun. 5, 2009, five pages.
Notice of Allowance dated Oct. 17, 2014, for U.S. Appl. No. 13/868,787, filed Apr. 23, 2013, 8 pages.
Notice of Allowance dated Jan. 23, 2015, for U.S. Appl. No. 13/250,955, filed Sep. 30, 2011, 11 pages.
Notice of Allowance dated Mar. 6, 2015, for U.S. Appl. No. 13/250,955, filed Sep. 30, 2011, 8 pages.
Notice of Allowance dated Jul. 25, 2016, for U.S. Appl. No. 13/351,096, filed Jan. 16, 2012, seven pages.
Notice of Allowance dated Dec. 30, 2016, for U.S. Appl. No. 14/619,958, filed Feb. 11, 2015, eleven pages.
Notice of Allowance dated Oct. 10, 2017, for U.S. Appl. No. 14/711,626, filed May 13, 2015, eight pages.
Office Action for Chinese Patent Application No. 200580027691.3, dated Jun. 20, 2008, 4 pages.
Office Action for Chinese Patent Application No. 200580027691.3, dated Mar. 27, 2009, 4 pages.
Office Action for Chinese Patent Application No. 200580027691.3, dated Sep. 4, 2009, 4 pages.
Office Action for Japanese Patent Application No. 2007-529978, dated Jul. 27, 2010, 2 pages.
Office Action for Japanese Patent Application No. 2007-529978, dated Apr. 5, 2011, 2 pages.
Office Action for Japanese Patent Application No. 2007-529978, dated Nov. 1, 2011, 9 pages.
Oral Proceedings for EP Patent Application No. 05788888.5-2224, mailed Nov. 16, 2009, 11 pages.
Oral Proceedings Summons for EP Patent Application No. 05788888.5-2224, mailed Mar. 18, 2009, 11 pages.
Partial European Search Report dated Sep. 13, 2009, for EP Application No. 08022346.4, filed Dec. 23, 2003, six pages.
PCT International Preliminary Report and Written Opinion for PCT International Appl. No. PCT/US2005/029467, dated Mar. 8, 2007, 7 pages.
PCT International Search Report and Written Opinion for PCT International Appl. No. US2005/029467, dated Apr. 10, 2006, 15 pages.
PCT Invitation to Pay Additional Fees for PCT Appl. No. US2005/029467, mailed Dec. 20, 2005, 5 pages.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI '92, pp. 659-660.
TouchPad Advanced Features, Synaptics, "Enriching the Interaction Between Humans and Intelligent Devices," Downloaded Aug. 16, 2004 (2 pages) http://www.synaptics.com/products/touchpad_features.cfm.
Trackpad, Apple Developer Connection (last updated Apr. 19, 2004, printed Aug. 19, 2004) (3 pages) http://developer.apple.com/documentation/Hardware/Developer_Notes/Macintosh_CPUs- . . .
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

Tracking Signal

Button Signal

SELECTIVE REJECTION OF TOUCH CONTACTS IN AN EDGE REGION OF A TOUCH SURFACE

CROSS REFERENCE TO RELATED APPLICATIONS

This application is a continuation of U.S. patent application Ser. No. 14/711,626, filed May 13, 2015 (U.S. Patent Application Publication No. 2015-0253891, which is a continuation of U.S. patent application Ser. No. 13/250,955, filed Sep. 30, 2011 and issued on May 26, 2015 as U.S. Pat. No. 9,041,663, which is a continuation of U.S. patent application Ser. No. 12/242,772 (U.S. Patent Application Publication No. 2009/0174679), filed Sep. 30, 2008, which claims the benefit of U.S. Provisional Patent Application No. 61/019,220 filed on Jan. 4, 2008, the contents of which are incorporated herein by reference in their entirety for all purposes.

FIELD OF THE INVENTION

This relates generally to input devices for computing systems, and more particularly, to the selective rejection of touch contacts in an edge region of a touch sensor panel.

BACKGROUND OF THE INVENTION

Many types of input devices are presently available for performing operations in a computing system, such as buttons or keys, mice, trackballs, touch sensor panels, joysticks, touch screens and the like. Touch screens, in particular, are becoming increasingly popular because of their ease and versatility of operation as well as their declining price. Touch screens can include a touch sensor panel, which can be a clear panel with a touch-sensitive surface. The touch sensor panel can be positioned in front of a display screen so that the touch-sensitive surface covers the viewable area of the display screen. Touch screens can allow a user to make selections and move a cursor by simply touching the display screen via a finger or stylus. In general, the touch screen can recognize the touch and position of the touch on the display screen, and the computing system can interpret the touch and thereafter perform an action based on the touch event.

Touch sensor panels can be implemented as an array of pixels formed by multiple drive lines (e.g. rows) crossing over multiple sense lines (e.g. columns), where the drive and sense lines are separated by a dielectric material. An example of such a touch sensor panel is described in Applicant's co-pending U.S. application Ser. No. 11/650,049 entitled "Double-Sided Touch Sensitive Panel and Flex Circuit Bonding," (U.S. Patent Application Publication No. 2008/0158181), filed on Jan. 3, 2007, the contents of which are incorporated by reference herein.

However, fingers and palms inadvertently in close proximity with a touch sensor panel can cause unintended gestures to be recognized and processed. These inadvertent touches can often occur when the touch sensor panel is separate from but adjacent to other input devices being used, such as a conventional keyboard or mechanical buttons or bars. Additionally, when the touch sensor panel itself is being used, fingers such as those used for stabilization of the hand (but not part of the gesture) or holding the device can accidentally touch the edges of the panel and be detected.

SUMMARY OF THE INVENTION

This relates to the selective rejection of touch contacts (touch events) in an edge region of a touch sensor panel to minimize unintended operations. In addition, by providing certain exceptions to the rejection of edge contacts, the functionality of the touch sensor panel can be maximized.

In some embodiments, contacts in edge bands around the perimeter of a touch sensor panel can simply be ignored. However, there can be a number of exceptions to edge rejection. For example, contacts in both the center area and the edge band can cause the contact in the edge band to be recognized as part of a gesture in certain circumstances. In other embodiments, if the contact in the edge band is stationary, it can be ignored. However if the contact in the edge band moves beyond a threshold distance or speed, it can then be recognized as part of a gesture.

Similarly, in trackpad embodiments, contacts within a bottom region of the trackpad can be ignored if stationary, but recognized as part of a gesture if moving. To accommodate different finger sizes, the size of one or more regions (e.g. the bottom or top region) can be modified based on an identification of the finger or thumb.

If contacts in the center or main region of a touch sensor panel track the movement of contacts in the edge band or bottom region, the contacts in the edge band or bottom region may not be ignored, but instead be recognized as part of a gesture. In addition, contacts appearing in the edge band or bottom region during the recognition of gestures in the center or main regions of a touch sensor panel can be recognized as part of the gesture or as a control input to implement operations such as drag lock or conversion of gestures. In other embodiments, two or more contacts detected in an edge band can be interpreted as a gesture if the contacts have a certain predetermined spacing (e.g., their centroids have an x-direction separation of between 1-3 cm).

DETAILED DESCRIPTION OF THE PREFERRED EMBODIMENT

In the following description of preferred embodiments, reference is made to the accompanying drawings in which it is shown by way of illustration specific embodiments in which the invention can be practiced. It is to be understood that other embodiments can be used and structural changes can be made without departing from the scope of the embodiments of this invention.

This relates to the selective rejection of touch contacts in an edge region of a touch sensor panel to minimize unintended operations. In addition, by providing certain exceptions to the rejection of edge contacts, the functionality of the touch sensor panel can be maximized.

Figure 1A:
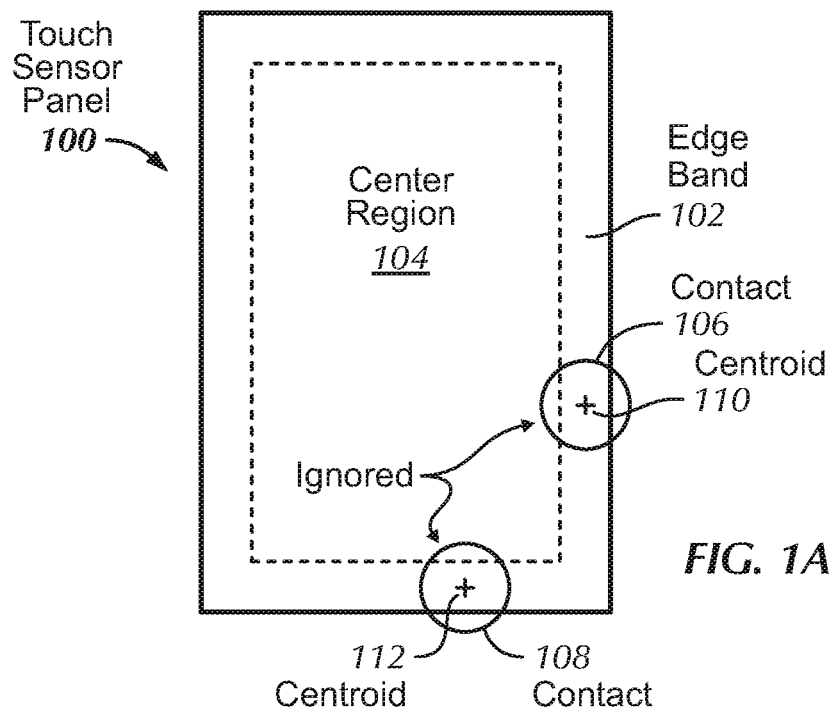
FIG. 1a illustrates an exemplary touch sensor panel implementing edge rejection according to one embodiment of this invention.

FIG. 1a illustrates exemplary touch sensor panel 100 implementing edge rejection according to embodiments of the invention. Edge band 102 (contact rejection region) can be created in an outer boundary of touch sensor panel 100, surrounding center area 104. If all contacts (e.g. fingers or palms) are detected in edge band 102, the contacts can be ignored. In the example of FIG. 1a, because touch images 106 and 108 have centroids 110 and 112, respectively, located in edge band 102, the contacts can be ignored.

Figure 1B:
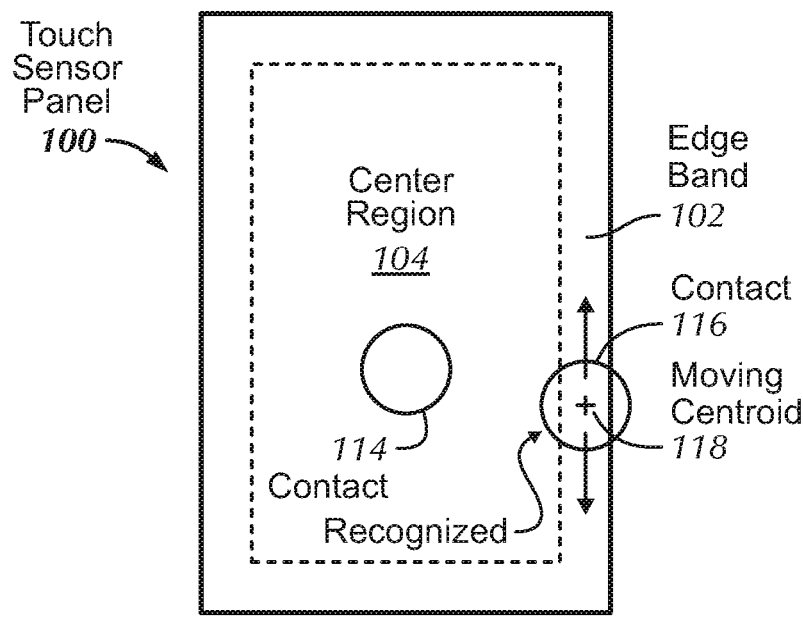
FIG. 1b illustrates an exemplary touch sensor panel implementing an exception to edge rejection according to one embodiment of this invention.

FIG. 1b illustrates a second scenario that can occur on exemplary touch sensor panel 100 according to embodiments of the invention. In the example of FIG. 1b, if contact 114 is detected in center area 104 along with contact 116 in edge band 102, a contact can be recognized in both the center area and the edge band. The recognition of the edge contact in this scenario in accordance with the aforementioned criteria (rejection or recognition criteria) can prevent intended gestures such as pinching gestures with contacts starting in an edge band from being ignored.

However, when fingers are used to perform an operation such as pointing in center area 104, a so-called "pinky" or other finger inadvertently placed in edge band 102 can be recognized, and an unintended gesture can be performed instead of the pointing gesture. Therefore, in other embodiments of the invention, if contacts 114 and 116 are detected at both center area 104 and edge band 102, and if centroid 118 of edge contact 116 does not move more than a threshold amount (e.g. 1 mm), it can be ignored. However, if edge contact 116 moves more than the threshold amount in any direction (even if there is no other finger detected in the center area), it can be recognized and become a trackable contact that can be part of a gesture. This recognition also allows for tracking operations to be performed within edge band 102.

Figure 2:
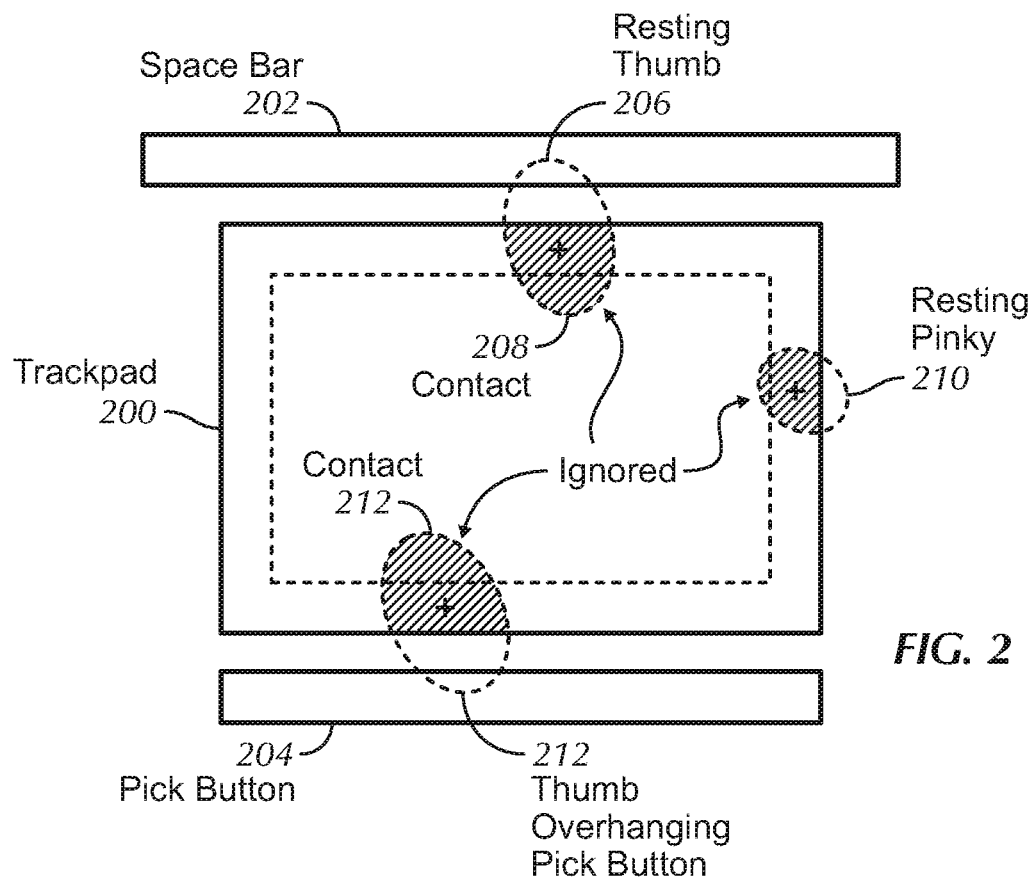
FIG. 2 illustrates an exemplary trackpad implementing edge rejection according to one embodiment of this invention.

FIG. 2 illustrates an exemplary touch sensor panel in the form of trackpad 200 implementing edge rejection according to embodiments of the invention. In the example of FIG. 2, adjacent to trackpad 200 is a conventional keyboard space bar 202 and mechanical pick button 204. Exemplary inadvertent touches illustrated in FIG. 2 can include thumb 206 resting on space bar 202 but also inadvertently resting on trackpad 200. The detected contact at 208 can be ignored so that clicks or other actions are not accidentally generated. In addition, pinky 210 inadvertently touching trackpad 200 can be ignored, and thumb 212 resting on pick button 204 but also overhanging the bottom of the trackpad at 214 can be ignored to avoid it being recognized as part of an unintended pinch gesture.

Figure 3A:
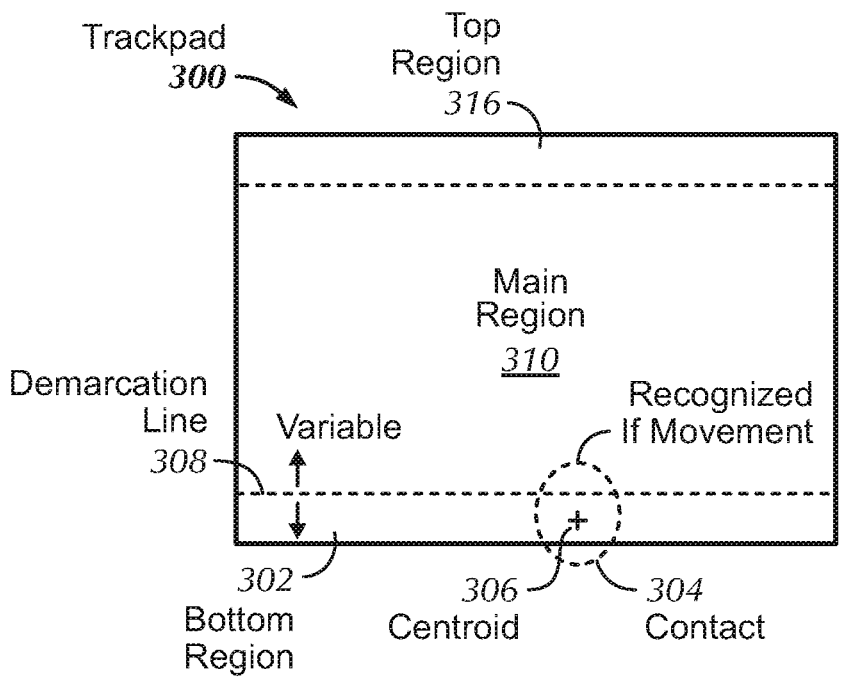
FIG. 3a illustrates an exemplary touch sensor panel implementing edge rejection and exceptions to edge rejection according to one embodiment of this invention.

FIG. 3a illustrates another exemplary touch sensor panel 300 implementing edge rejection according to embodiments of the invention. In the example of FIG. 3a, touch sensor panel 300 can include a bottom region 302 that can normally be reserved for performing certain non-gesture actions. For example, finger taps in bottom region 302 can be interpreted as a "click" or selection function. Thus, contacts in bottom region 302 can normally be ignored for all purposes except these functions. Nevertheless, it can be desirable to have contacts in bottom region 302 recognized as part of a gesture in certain circumstances. Therefore, according to some embodiments of the invention, in accordance with rejection or recognition criteria, contacts 304 identified as a finger (i.e. a non-concentric image of touch of a certain threshold size) occurring within the bottom region can be ignored if centroid 306 is stationary, but can be recognized as part of a gesture if the centroid is not stationary. Identification of touch events is disclosed in U.S. Pat. No. 6,323,846 entitled "Method and Apparatus for Integrating Manual Input," the contents of which are incorporated herein by reference in its entirety for all purposes. Stationary, as defined herein, is when the centroid moves less than a threshold amount from a computed centroid center, or remains below some speed threshold. If the difference between an instantaneous position and a low pass filter (LPF) averaged position value exceeds a certain threshold value, the centroid can be considered in motion and no longer stationary. Using this criteria, contacts with slow drifting or rolling motions can be ignored, but faster drifts can cause the contact to be recognized as part of a gesture.

In another embodiment of the invention, the size of bottom region 302 or top region 316 (or any other edge region) can dynamically change based on a determination that a contact was caused by a particular finger. For example, if a thumb is detected in bottom region 302, then based on the radius of the touch area, demarcation line 308 defining the bottom region can be moved upward to increase the size of the bottom region. However, if a finger is detected in bottom region 302, demarcation line 308 can be moved downward to decrease the size of the bottom region. Similar adjustments can be made for the top region 316, or any other edge regions (e.g. left or right side regions).

As described above, contacts in bottom region 302 can be treated as non-contacts independent from main region 310, although in some embodiments contacts in the bottom region can be detected and used in conjunction with contacts in the main area. For example, if the contacts in bottom region 302 move in a manner that is synchronous with or otherwise associated with movements in main region 310, the contacts in the bottom region can be recognized along with the contacts in the main region as part of the gesture.

Figure 3B:
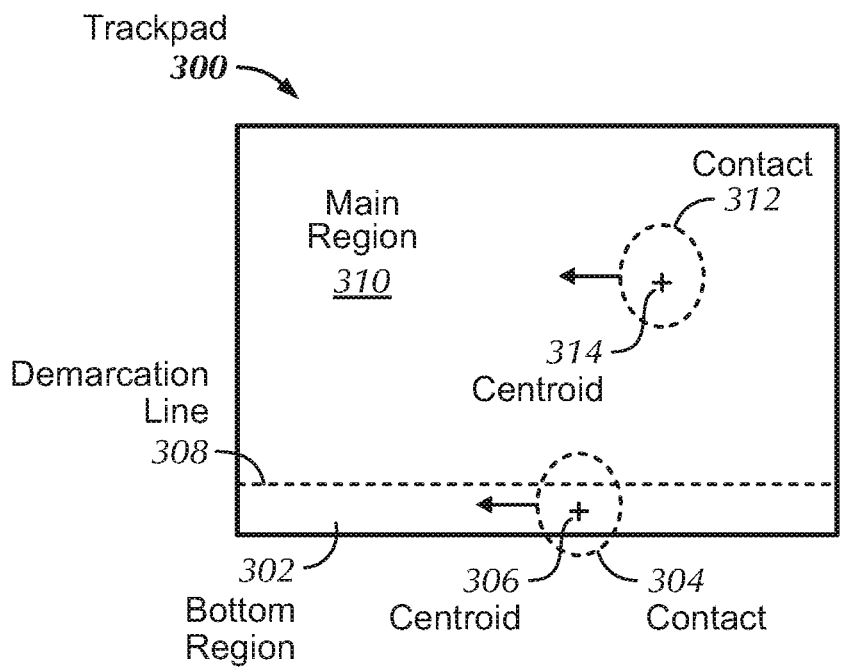
FIG. 3b illustrates an exemplary touch sensor panel implementing edge rejection exceptions based on the recognition of two contacts having synchronized movements according to one embodiment of this invention.

FIG. 3b illustrates the recognition of two contacts having synchronized movements according to embodiments of the invention. In the example of FIG. 3b, if contacts 304 and 312 move in a substantially synchronous manner with respect to each other, contact 304 can be recognized along with contact 312 as part of a gesture. Otherwise, contact 304 can be ignored. Two contacts moving "synchronously," as defined herein, can include centroids moving at approximately the same speed and/or direction (either X and Y components together, or only the X or only the Y components). In other embodiments, the synchronized movements of two contacts can include touching down synchronously. Thus, even though one of the two contacts may touch down within an edge band, if it touches down at substantially the same time as a contact touching down in the main region 310, the two contacts can be recognized as part of a gesture.

Figure 4:
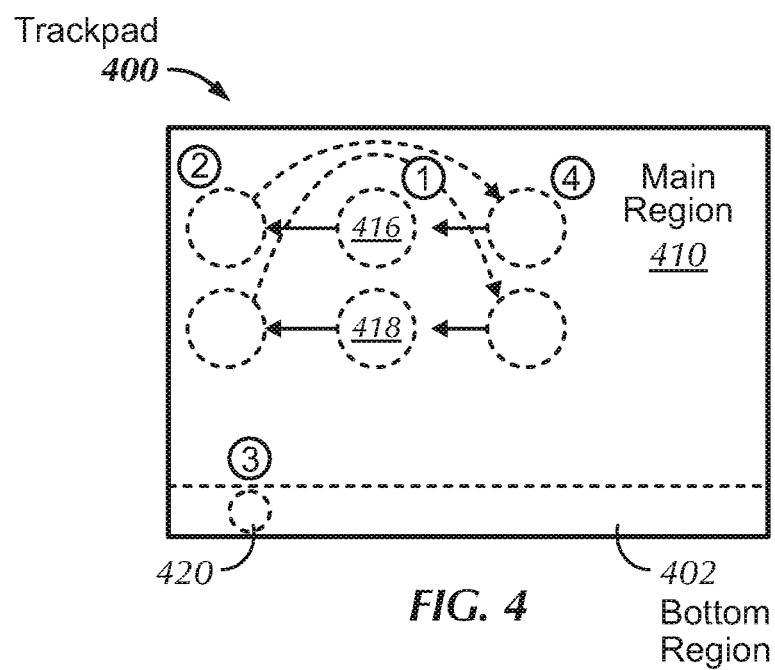
FIG. 4 illustrates an exemplary touch sensor panel implementing exceptions to edge rejection in order to provide a drag lock function according to one embodiment of this invention.

FIG. 4 illustrates another exemplary exception to edge rejection according to embodiments of the invention. In the example of FIG. 4, at location (1), contacts 416 and 418 caused by two fingers within main region 410 move to the left as part of an intended drag operation. At location (2), contacts 416 and 418 have reached the leftmost edge of main region 410. If the drag operation is to continue, at location (3) a thumb can be placed down in bottom region 402, causing contact 420 to appear. In this embodiment, instead of being ignored, the two preexisting contacts 416 and 418 cause contact 420 to be recognized as a so-called "drag lock" feature of the gesture. With the drag lock in place, the two fingers can be temporarily lifted off the touch sensor panel and touched down again towards the center of main region 410 at location (4), where the leftward drag operation can continue. It should be understood that this edge rejection exception can also be applied to other gestures in main region 410, wherein other contacts in the main region, optionally accompanied by movement, can cause subsequent contacts in bottom region 402 to be recognized as part of a gesture. Alternatively, the subsequent contact in bottom region 402 can cause a change in the gesture recognized in main region 410. For example, a pointing function in main region 410 can be converted to a drag function as soon as a contact is either detected in, or removed from, bottom region 402.

Figure 5A:
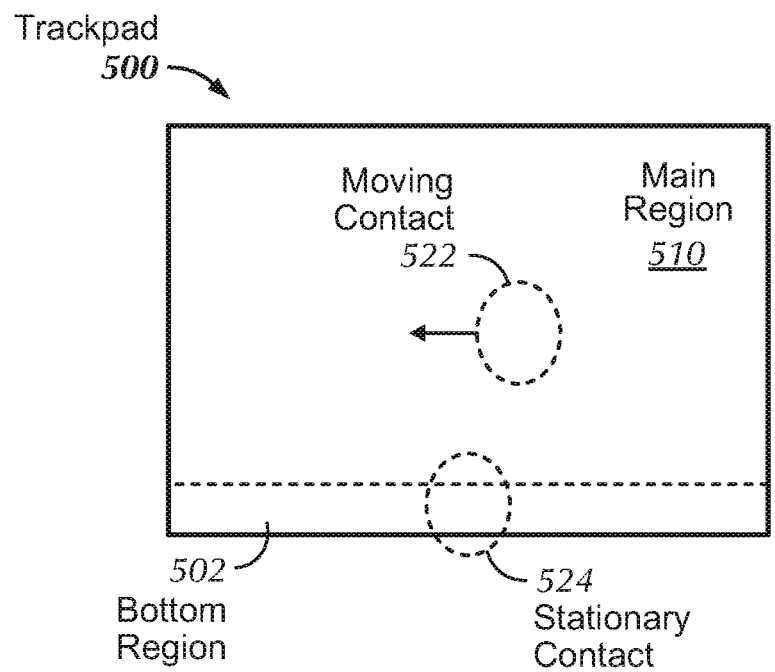
FIG. 5a illustrates an exemplary touch sensor panel implementing exceptions to edge rejection based on contacts in an edge region and a main region according to one embodiment of this invention.

FIG. 5a illustrates another exemplary exception to edge rejection according to embodiments of the invention. In FIG. 5a, stationary thumb 524 detected in bottom region 502 plus finger 522 detected in main region 510 can be recognized as the start of a finger drag gesture, and can remain so as long as the finger moves while the thumb remains stationary.

Figure 5B:
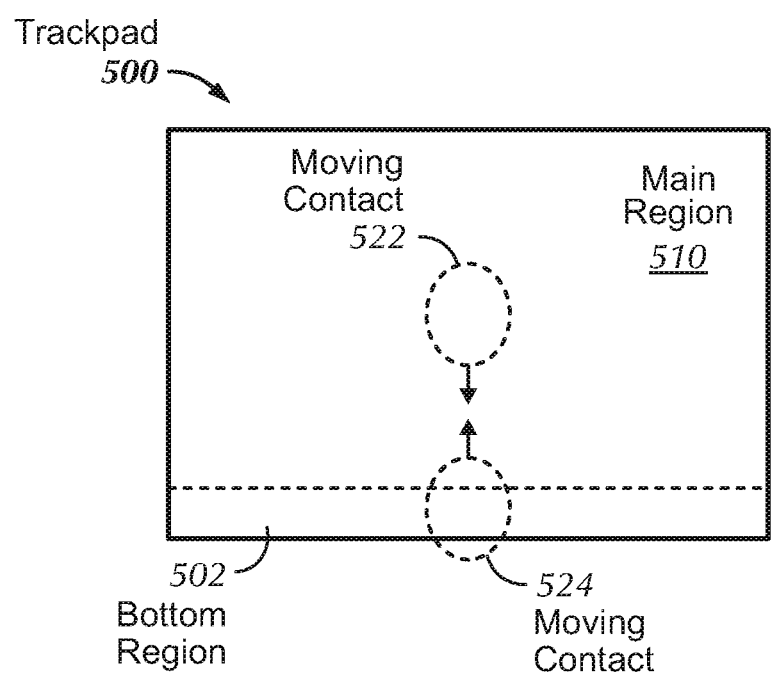
FIG. 5b illustrates an exemplary touch sensor panel implementing exceptions to edge rejection in order to allow a pinching gesture according to one embodiment of this invention.

FIG. 5b illustrates yet another exemplary exception to edge rejection according to embodiments of the invention. In FIG. 5b, thumb 524 detected in bottom region plus finger 522 detected in main region 510 moving simultaneously towards each other can be recognized as the start of a pinch gesture.

Figure 5C:
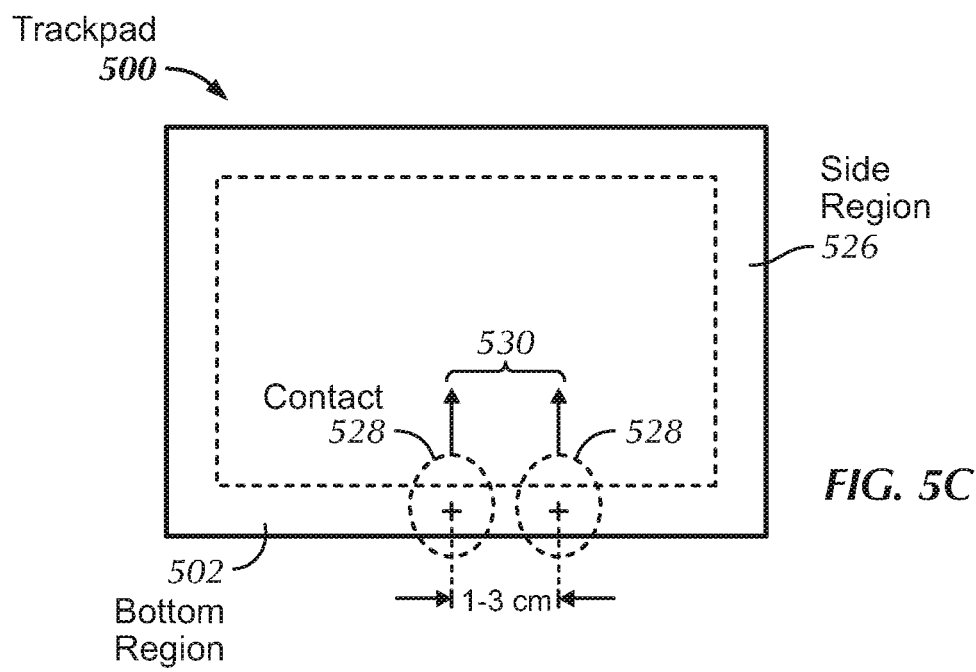
FIGS. 5c and 5d illustrate an exemplary exception to edge rejection and an example of edge rejection, respectively, according to embodiments of the invention.

FIG. 5c illustrates another exemplary exception to edge rejection according to embodiments of the invention. In FIG. 5c, two or more contacts 528 detected in an edge band (e.g. bottom region 502) can be interpreted as a gesture if the contacts have a certain predetermined spacing (e.g., the contacts have centroids with an x-direction separation of between 1-3 cm). In this manner, for example, two fingers starting a scroll in the bottom region 502 (and then moving upwards as indicated at 530) will immediately start the gesture instead of being ignored as edge straddles.

Figure 5D:
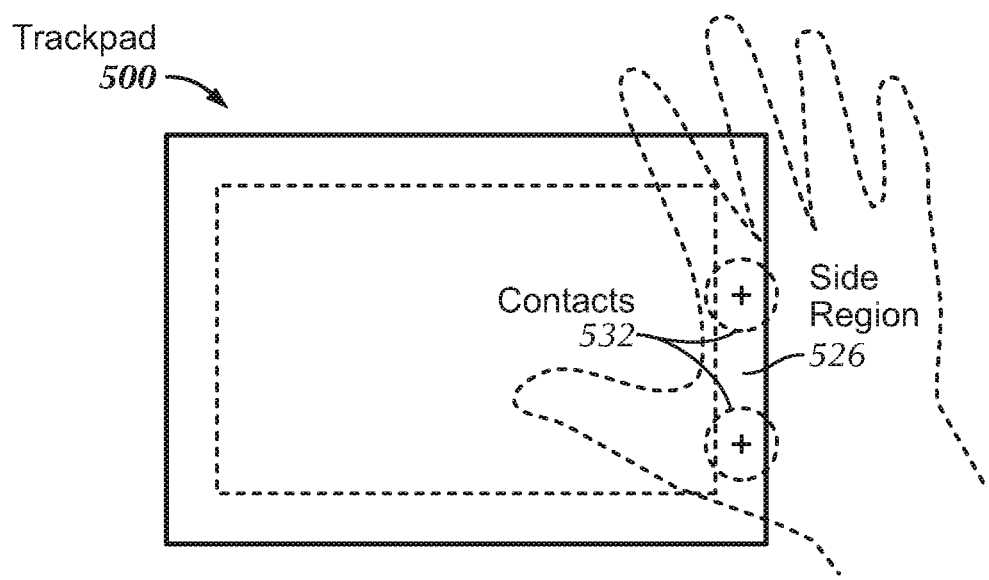

FIG. 5d illustrates, however, that in certain regions, two contacts occurring in an edge band can be ignored. In the example of FIG. 5d, two contacts 532 in side region 526 occurring as a result of an edge-straddling palm can be ignored to avoid initiating an inadvertent scroll.

Figure 6:
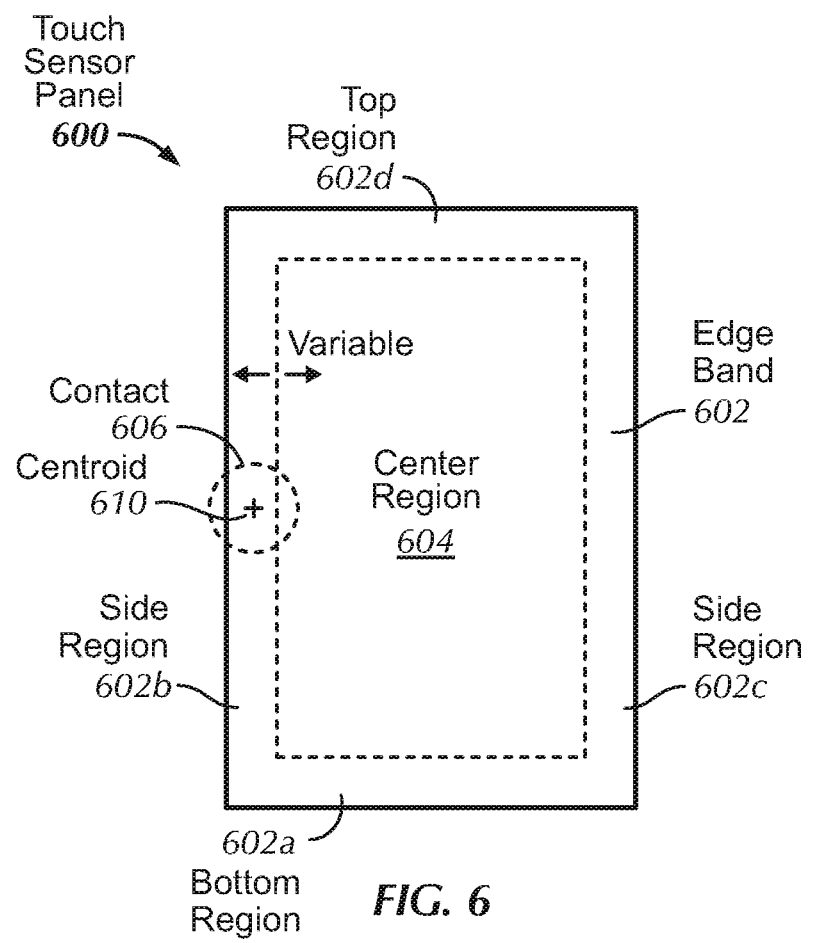
FIG. 6 illustrates an exemplary touch sensor panel employing edge rejection with a variable width edge band according to one embodiment of this invention.

FIG. 6 illustrates an exemplary touch sensor panel 600 employing edge rejection with a variable width edge band 602 according to embodiments of the invention. In the example of FIG. 6, the width of edge band 602 can be dependent on a major radius of contact 606. A large major radius (above a certain threshold) of a contact whose centroid 610 is located within edge band 602 can cause the edge band to be larger in order to better ignore a thumb as opposed to a fingertip. The amount or percentage of the major radius above the threshold can be used to scale up edge band 602. Alternatively, the width of edge band 602 may not be dependent on the major radius, but instead can be based on the identification of a particular finger type. In some embodiments, the variable width edge band 602 may have a non-uniform width, and may be wider along one or more edges of the touch sensor panel and narrower along one or more different edges of the touch sensor panel. For example, a bottom region 602a of edge band 602 may have a width that is greater than that of side regions 602b and 602c and top region 602d.

Figure 7A:
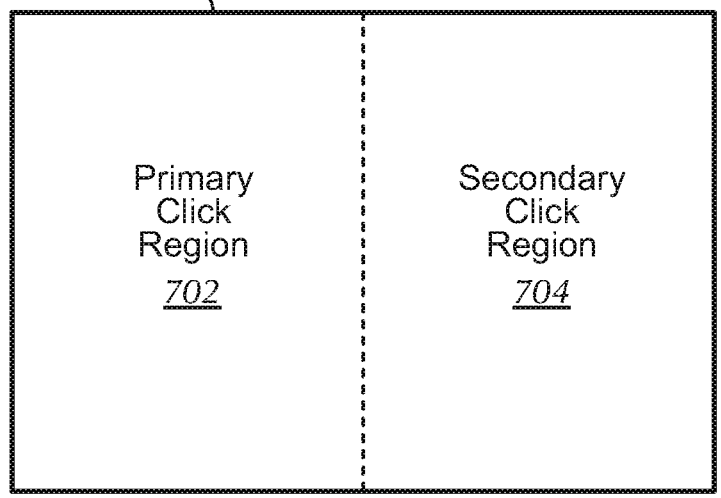
FIG. 7a illustrates an exemplary trackpad 700 having an integrated pick button and click regions according to embodiments of the invention.

FIG. 7a illustrates an exemplary trackpad 700 having an integrated pick button according to embodiments of the invention. In the example of FIG. 7a, the trackpad 700 can be mechanically actuated by pushing on the trackpad to generate a "click" input to implement a mechanical pick button. Trackpads with integrated pick buttons are described in FIGS. 10-15 below.

In the trackpad 700 of FIG. 7a, sufficient pressure anywhere on the surface of the trackpad can cause the click to be generated, and thus the click itself is not determinative of the location of the click. Therefore, according to embodiments of the invention, touch sensing on the trackpad 700 can be used to determine how a click should be interpreted. When a mechanical click is detected, the interpretation of the click and the resulting functionality initiated can depend on where a touch was detected on the trackpad. In the example embodiment of FIG. 7a, the trackpad 700 is partitioned into a primary click region 702 and secondary click region 704. When a touch is detected on the primary click region 702 along with a mechanical click from the trackpad, a left-click action can be initiated, for example. Similarly, when a touch is detected on the secondary click region 704 along with a mechanical click from the trackpad, a right-click action can be initiated, for example. The partitioning of the trackpad 700 can be implemented in firmware.

The example of FIG. 7a shows equal-sized primary and secondary click regions 702 and 704. However, in other embodiments, the size or area of the click regions may be unequal to account for intended usage patterns and avoid misinterpreted clicks. For example, because the secondary click region 704 may be less frequently used than the primary click region 702, the secondary click region may be made smaller and/or located in a region less likely to be clicked upon, such as the lower right corner of the trackpad 700.

Figure 7B:
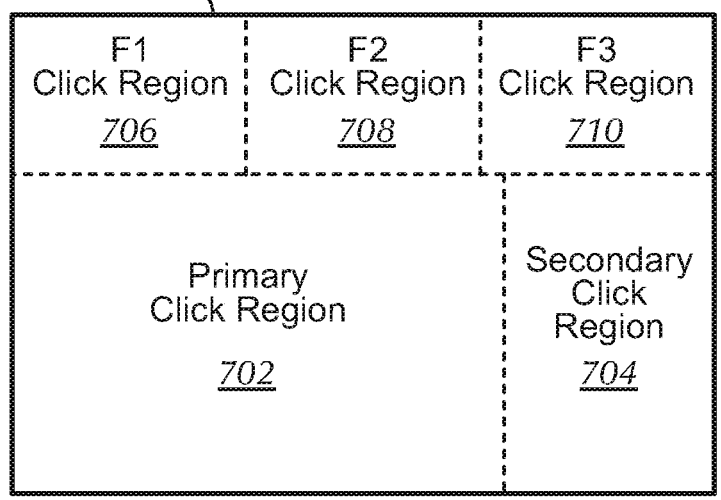
FIG. 7b illustrates an exemplary extension of the embodiment of FIG. 7a in which more than two click regions can be defined according to embodiments of the invention.

FIG. 7b illustrates an exemplary extension of the embodiment of FIG. 7a in which more than two click regions can be defined. In the example of FIG. 7b, in addition to primary and secondary click regions 702 and 704, a number of function key click regions 706, 708 and 710 can be defined. A click of the trackpad 700 along with a touch in any of these regions can initiate a corresponding action. Those skilled in the art will understand that because the partitions are implemented in firmware, any number of regions, in any number of configurations, can also be employed. In further embodiments, these regions can dynamically change in accordance with a particular usage of the computing device (e.g., in accordance with the application being executed or the user interface being displayed).

Embodiments of the invention described above can be implemented using touch sensor panels of the types described in U.S. application Ser. No. 11/650,049 entitled "Double-Sided Touch Sensitive Panel and Flex Circuit Bonding," filed Jan. 3, 2007 (U.S. Patent Application Publication No. 2008/0158181). Sense channels of the types described in U.S. application Ser. No. 11/649,998 entitled "Proximity and Multi-Touch Sensor Detection and Demodulation," filed Jan. 3, 2007 (U.S. Patent Application Publication No. 2008/0158172) can be used to detect touch and hover events. The resulting image of touch can be further processed to determine the location of the touch events, the identification of finger contacts, and the identification of gestures as described in U.S. application Ser. No. 11/428,522 entitled "Identifying Contacts on a Touch Surface," filed Jul. 3, 2006 (U.S. Patent Application Publication No. 2006/0238522), U.S. application Ser. No. 11/756,211 entitled "Multi-touch Input Discrimination," filed May 31, 2007 (U.S. Patent Application Publication No. 2008/0158185) and U.S. application Ser. No. 10/903,964 entitled "Gestures for Touch Sensitive Input Devices," filed Jul. 30, 2004 (U.S. Patent Application Publication No. 2006/0026521). All of the preceding applications referred to in this paragraph are incorporated by reference herein in their entirety for all purposes.

Figure 8:
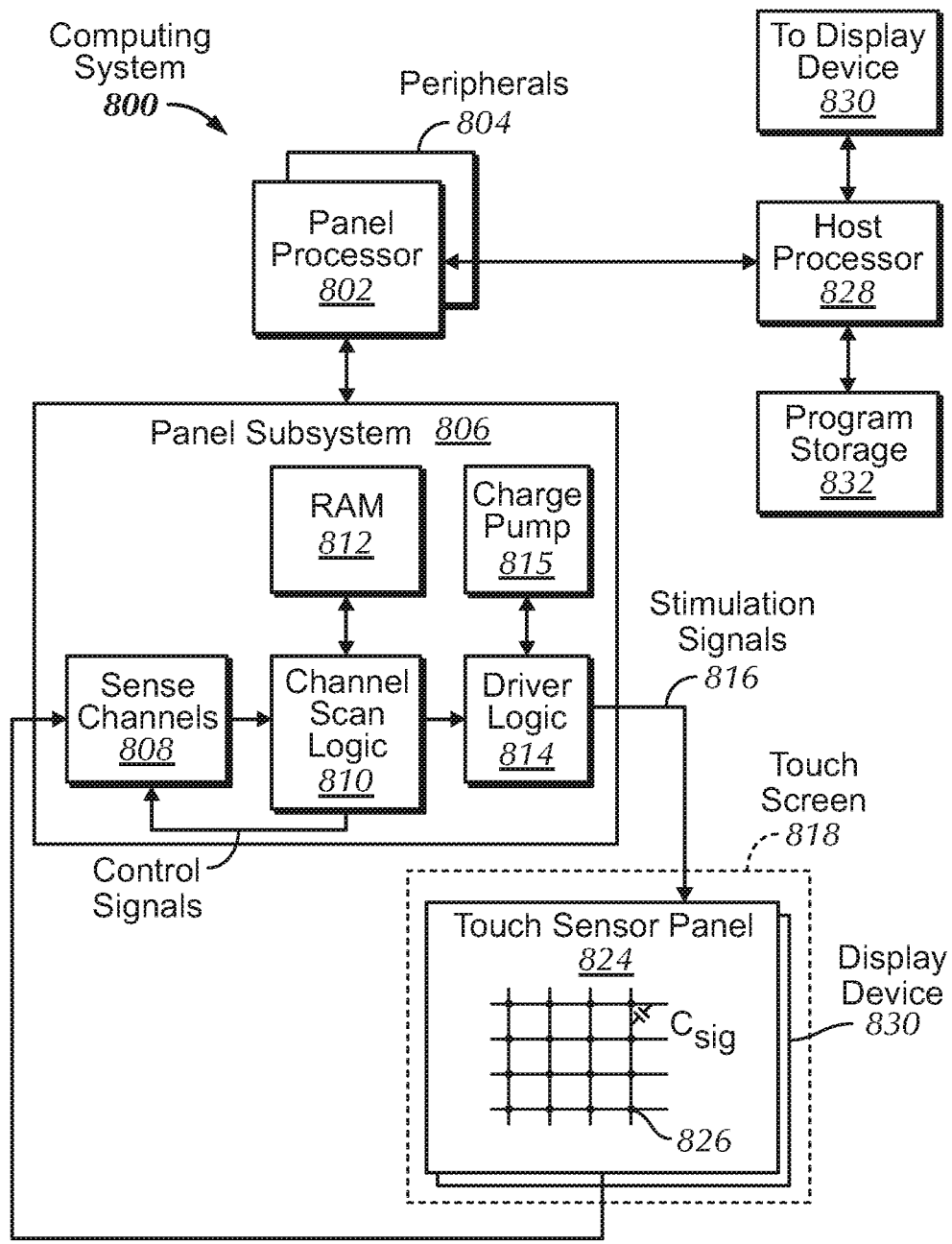
FIG. 8 illustrates an exemplary computing system operable with a touch sensor panel to implement edge rejection and exceptions to edge rejection according to one embodiment of this invention.

FIG. 8 illustrates exemplary computing system 800 that can include one or more of the embodiments of the invention described above. Computing system 800 can include one or more panel processors 802 and peripherals 804, and panel subsystem 806. Peripherals 804 can include, but are not limited to, random access memory (RAM) or other types of memory or storage, watchdog timers and the like. Panel subsystem 806 can include, but is not limited to, one or more sense channels 808, channel scan logic 810 and driver logic 814. Channel scan logic 810 can access RAM 812, autonomously read data from the sense channels and provide control for the sense channels. In addition, channel scan logic 810 can control driver logic 814 to generate stimulation signals 816 at various frequencies and phases that can be selectively applied to drive lines of touch sensor panel 824 at a voltage established by charge pump 815. In some embodiments, panel subsystem 806, panel processor 802 and peripherals 804 can be integrated into a single application specific integrated circuit (ASIC).

Touch sensor panel 824 can include a capacitive sensing medium having a plurality of drive lines and a plurality of sense lines, although other sensing media can also be used. Each intersection, adjacency or near-adjacency of drive and sense lines can represent a capacitive sensing node and can be viewed as picture element (pixel) 826, which can be particularly useful when touch sensor panel 824 is viewed as capturing an "image" of touch. (In other words, after panel subsystem 806 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel).) Each sense line of touch sensor panel 824 can drive sense channel 808 (also referred to herein as an event detection and demodulation circuit) in panel subsystem 806.

Computing system 800 can also include host processor 828 for receiving outputs from panel processor 802 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 828 can also perform additional functions that may not be related to panel processing, and can be coupled to program storage 832 and display device 830 such as an LCD display for providing a UI to a user of the device. Display device 830 together with touch sensor panel 824, when located partially or entirely under the touch sensor panel, or partially or entirely integrated with the touch sensor panel, can form touch screen 818.

Note that one or more of the functions described above can be performed by firmware stored in memory (e.g. one of the peripherals 804 in FIG. 8) and executed by panel processor 802, or stored in program storage 832 and executed by host processor 828. The firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any storage medium that can contain or store the program for use by or in connection with the instruction execution system, apparatus, or device. The computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 9A:
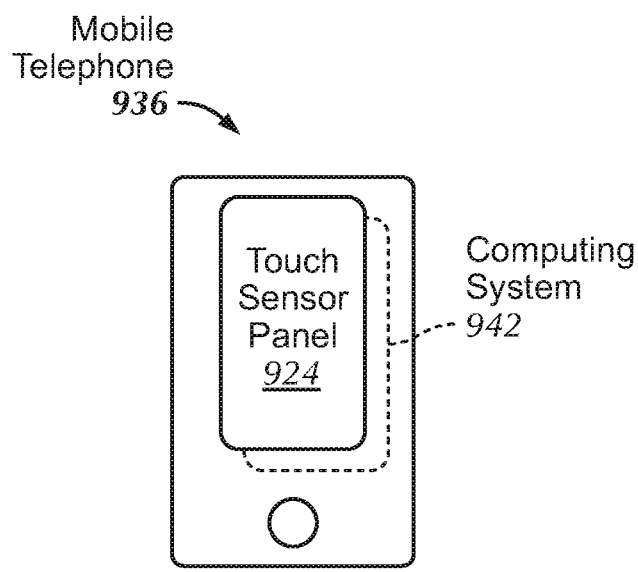
FIG. 9a illustrates an exemplary mobile telephone that can include a touch sensor panel and computing system for implementing edge rejection and exceptions to edge rejection according to one embodiment of this invention.
Figure 9B:
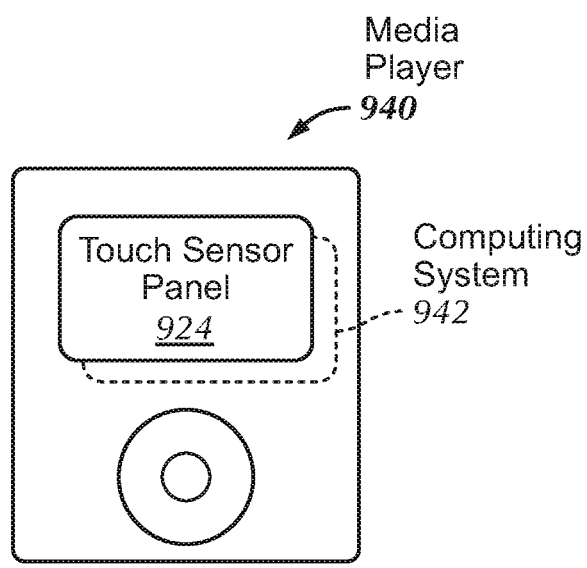
FIG. 9b illustrates an exemplary digital media player that can include a touch sensor panel and computing system for implementing edge rejection and exceptions to edge rejection according to one embodiment of this invention.
Figure 9C:
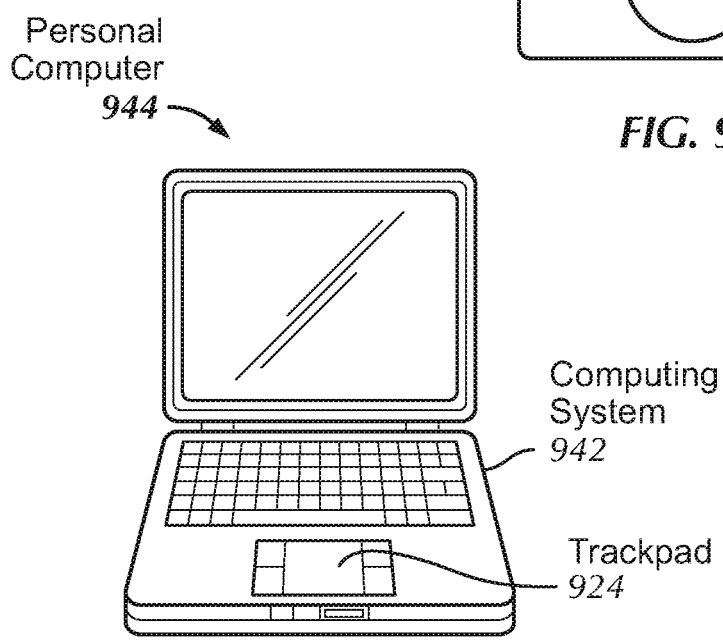
FIG. 9c illustrates an exemplary personal computer that can include a touch sensor panel and computing system for implementing edge rejection and exceptions to edge rejection according to one embodiment of this invention.

FIG. 9a illustrates exemplary mobile telephone 936 that can include touch sensor panel 924 and computing system 942 for implementing edge rejection and the edge rejection exceptions described above according to embodiments of the invention. FIG. 9b illustrates exemplary digital media player 940 that can include touch sensor panel 924 and computing system 942 for implementing edge rejection and the edge rejection exceptions described above according to embodiments of the invention. FIG. 9c illustrates exemplary personal computer 944 that can include touch sensor panel (trackpad) 924 and computing system 942 for implementing edge rejection and the edge rejection exceptions described above according to embodiments of the invention. The mobile telephone, media player, and personal computer of FIGS. 9a, 9b and 9c can advantageously benefit from the edge rejection and the edge rejection exceptions described above because implementation of these features can minimize unintended operations while providing maximum functionality.

As discussed above, some embodiments of the invention are directed to trackpads with integrated pick buttons. One example of a trackpad with an integrated pick button is described below with reference to FIGS. 10-15. However, it should be understood that other trackpads or input devices having integrated pick buttons also fall within the scope of embodiments of the present invention.

Figure 10:
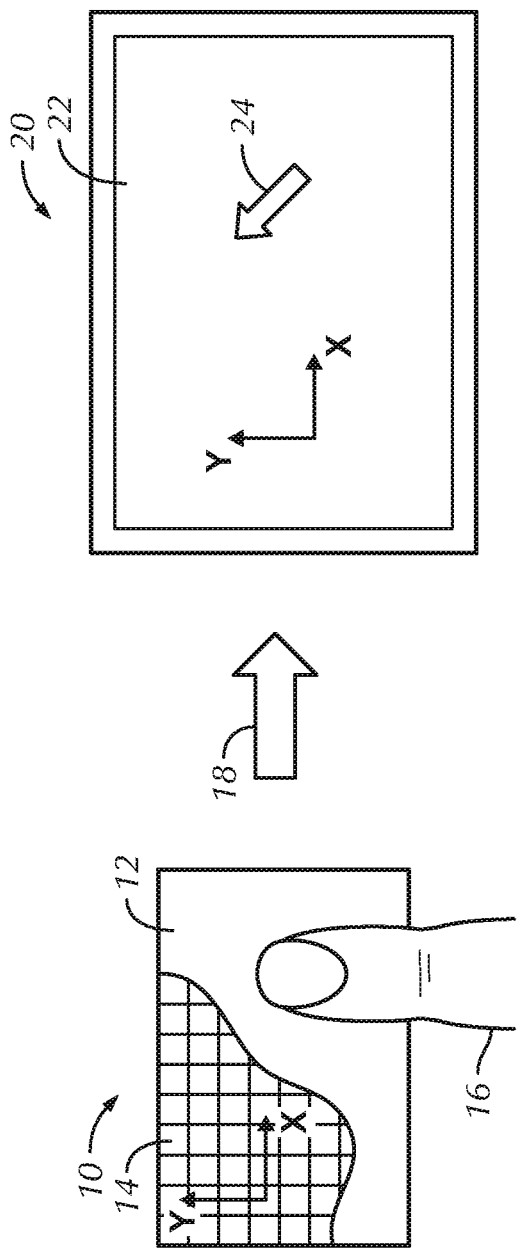
FIG. 10 is a simplified diagram of an exemplary touch pad and display according to one embodiment of this invention.

FIG. 10 is a simplified diagram of an exemplary touch pad and display according to embodiments of the invention. In the example of FIG. 10, a touch-sensitive track pad 10 can be a small (often rectangular) area that includes a protective/cosmetic shield 12 and a plurality of electrodes 14 disposed underneath the protective shield 12. Electrodes 14 may be located on a circuit board, for example a printed circuit board (PCB). For ease of discussion, a portion of the protective shield 12 has been removed to show the electrodes 14. Different electrodes 14 or combinations thereof can represent different x, y positions. In one configuration, as a finger 16 (or alternatively a stylus, not shown) approaches the electrode grid 14, the finger may form a capacitance with one or more electrodes proximate to the finger or may change existing capacitances between one or more such electrodes. The circuit board/sensing electronics (not shown) measures such capacitance changes and produces an input signal 18 which is sent to a host device 20 (e.g., a computing device) having a display screen 22. The input signal 18 is used to control the movement of a cursor 24 on a display screen 22. As shown, the input pointer moves in a similar x, y direction as the detected x, y finger motion.

Figure 11:
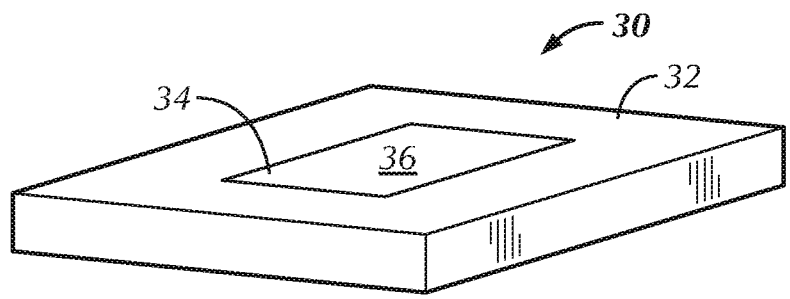
FIG. 11 is a perspective view of an exemplary input device according to one embodiment of this invention.

FIG. 11 is a simplified perspective view of an exemplary input device according to embodiments of the invention. The input device 30 is generally configured to send information or data to an electronic device (not shown) in order to perform an action on a display screen (e.g., via a graphical user interface (GUI))—for example, moving an input pointer, making a selection, providing instructions, etc. The input device may interact with the electronic device through a wired (e.g., cable/connector) or wireless connection (e.g., IR, bluetooth, etc.).

The input device 30 may be a stand alone unit or it may be integrated into the electronic device. When in a stand alone unit, the input device typically has its own enclosure. When integrated with an electronic device, the input device typically uses the enclosure of the electronic device. In either case, the input device may be structurally coupled to the enclosure as for example through screws, snaps, retainers, adhesives and the like. In some cases, the input device may be removably coupled to the electronic device as for example through a docking station. The electronic device to which the input device is coupled may correspond to any consumer related electronic product. By way of example, the electronic device may correspond to a computer such as a desktop computer, laptop computer or PDA, a media player such as a music player, a communication device such as a mobile phone, another input device such as a keyboard, and the like.

As shown in FIG. 11, the input device 30 includes a frame 32 (or support structure) and a track pad 34. The frame 32 provides a structure for supporting the components of the input device. The frame 32, in the form of a housing, may also enclose or contain the components of the input device. The components, which include the track pad 34, may correspond to electrical, optical and/or mechanical components for operating the input device 30.

Track pad 34 provides an intuitive interface configured to provide one or more control functions for controlling various applications associated with the electronic device to which it is attached. By way of example, the touch initiated control function may be used to move an object or perform an action on the display screen or to make selections or issue commands associated with operating the electronic device. In order to implement the touch initiated control function, the track pad 34 may be arranged to receive input from a finger (or object) moving across the surface of the track pad 34 (e.g., linearly, radially, angular, etc.), from a finger holding a particular position on the track pad 34 and/or by a finger tapping on a particular position of the track pad 34. As should be appreciated, the touch pad 34 provides easy one-handed operation, i.e., lets a user interact with the electronic device with one or more fingers.

The track pad 34 may be widely varied. For example, the touch pad 34 may be a conventional track pad based on the Cartesian coordinate system, or the track pad 34 may be a touch pad based on a polar coordinate system. An example of a touch pad based on polar coordinates may be found in U.S. Pat. No. 7,046,230 to Zadesky et al., entitled "TOUCH PAD FOR HANDHELD DEVICE", filed Jul. 1, 2002, which is hereby incorporated by reference herein in its entirety for all purposes.

The track pad 34 may be used in a relative or absolute mode. In absolute mode, the track pad 34 reports the absolute coordinates of where it is being touched (for example x, y in the case of the Cartesian coordinate system or (r, θ) in the case of the polar coordinate system). In relative mode, the track pad 34 reports the direction and/or distance of change (for example, left/right, up/down, and the like). In most cases, the signals produced by the track pad 34 direct motion on the display screen in a direction similar to the direction of the finger as it is moved across the surface of the track pad 34.

The shape of the track pad 34 may be widely varied. For example, the track pad 34 may be circular, oval, square, rectangular, triangular, and the like. In general, the outer perimeter of the track pad 34 defines the working boundary of the track pad 34. In the illustrated embodiment, the track pad is rectangular. Rectangular track pads are common on laptop computers. Circular track pads allow a user to continuously swirl a finger in a free manner, i.e., the finger can be rotated through 360 degrees of rotation without stopping. Furthermore, the user can rotate his or her finger tangentially from all sides thus giving it more range of finger positions. Both of these features may help when performing a scrolling function, making circular track pads advantageous for use with portable media players (e.g., iPod media players produced by Apple Inc. of Cupertino, Calif.). Furthermore, the size of the track pad 34 generally corresponds to a size that allows them to be easily manipulated by a user (e.g., the size of a finger tip or larger).

The track pad 34, which generally takes the form of a rigid planar platform, includes a touchable outer track surface 36 for receiving a finger (or object) for manipulation of the track pad. Although not shown in FIG. 11, beneath the touchable outer track surface 36 is a sensor arrangement that is sensitive to such things as the pressure and/or motion of a finger thereon. The sensor arrangement typically includes a plurality of sensors that are configured to activate as the finger sits on, taps on or passes over them. In the simplest case, an electrical signal is produced each time the finger is positioned over a sensor. The number of signals in a given time frame may indicate location, direction, speed, and acceleration of the finger on the track pad 34, i.e., the more signals, the more the user moved his finger. In most cases, the signals are monitored by an electronic interface that converts the number, combination and frequency of the signals into location, direction, speed and acceleration information. This information may then be used by the electronic device to perform the desired control function on the display screen. The sensor arrangement may be widely varied. By way of example, the sensors may be based on resistive sensing, surface acoustic wave sensing, pressure sensing (e.g., strain gauge), infra red sensing, optical sensing, dispersive signal technology, acoustic pulse recognition, capacitive sensing and the like.

In the illustrated embodiment, the track pad 34 is based on capacitive sensing. As is generally well known, a capacitance-based track pad is arranged to detect changes in capacitance as the user moves an object such as a finger around the track pad. In most cases, the capacitive track pad includes a protective shield, one or more electrode layers, a circuit board and associated electronics including an application specific integrated circuit (ASIC). The protective shield is placed over the electrodes; the electrodes are mounted on the top surface of the circuit board; and the ASIC is mounted on the bottom surface of the circuit board. The protective shield serves to protect the underlayers and to provide a surface for allowing a finger to slide thereon. The surface is generally smooth so that the finger does not stick to it when moved. The protective shield also provides an insulating layer between the finger and the electrode layers. The electrode layer includes a plurality of spatially distinct electrodes. Any suitable number of electrodes may be used. In most cases, it would be desirable to increase the number of electrodes so as to provide higher resolution, i.e., more information can be used for things such as acceleration.

Capacitive sensing works according to the principals of capacitance. As should be appreciated, whenever two electrically conductive members come close to one another without actually touching, their electric fields interact to form capacitance. In the configuration discussed above, the first electrically conductive member is one or more of the electrodes and the second electrically conductive member is, for example, the finger of the user. Accordingly, as the finger approaches the touch pad, a tiny capacitance forms between the finger and the electrodes in close proximity to the finger. The capacitance in each of the electrodes is measured by an ASIC located on the backside of the circuit board. By detecting changes in capacitance at each of the electrodes, the ASIC can determine the location, direction, speed and acceleration of the finger as it is moved across the touch pad. The ASIC can also report this information in a form that can be used by the electronic device.

In accordance with one embodiment, track pad 34 is movable relative to frame 32 so as to initiate another set of signals (other than just tracking signals). By way of example, track pad 34 in the form of the rigid planar platform may rotate, pivot, slide, translate, flex and/or the like relative to frame 32. Track pad 34 may be coupled to frame 32 and/or it may be movably restrained by frame 32. By way of example, track pad 34 may be coupled to frame 32 through screws, axels, pin joints, slider joints, ball and socket joints, flexure joints, magnets, cushions and/or the like. Track pad 34 may also float within a space of the frame (e.g., gimbal). It should be noted that the input device 30 may additionally include a combination of joints such as a pivot/translating joint, pivot/flexure joint, pivot/ball and socket joint, translating/flexure joint, and the like to increase the range of motion (e.g., increase the degree of freedom). When moved, touch pad 34 is configured to actuate a circuit that generates one or more signals. The circuit generally includes one or more movement indicators such as switches, sensors, encoders, and the like. An example of a gimbaled track pad may be found in patent application Ser. No. 10/643,256, entitled, "MOVABLE TOUCH PAD WITH ADDED FUNCTIONALITY," filed Aug. 18, 2003 (U.S. Patent Application Publication No. 2006/0026521), which is hereby incorporated by reference herein in its entirety for all purposes.

Figure 12A:
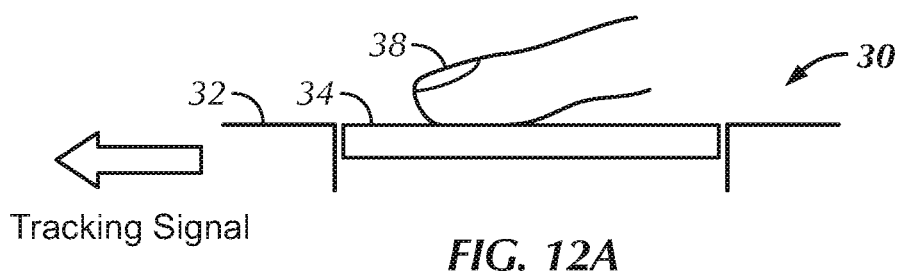
FIGS. 12A, 12B, 12C and 12D are simplified side views of an exemplary input device having a button touch pad according to one embodiment of this invention.
Figure 12B:
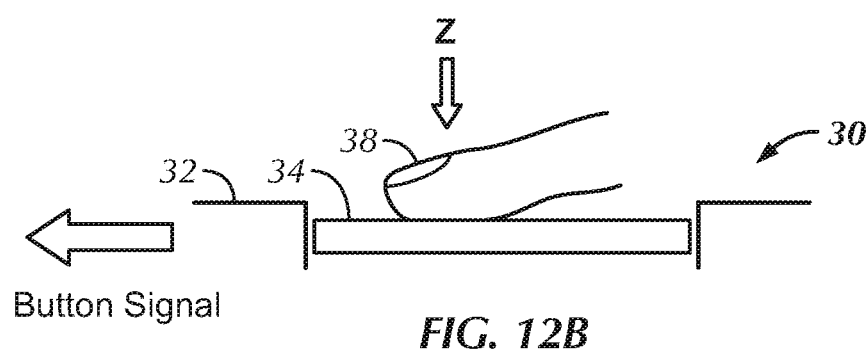
Figure 12C:
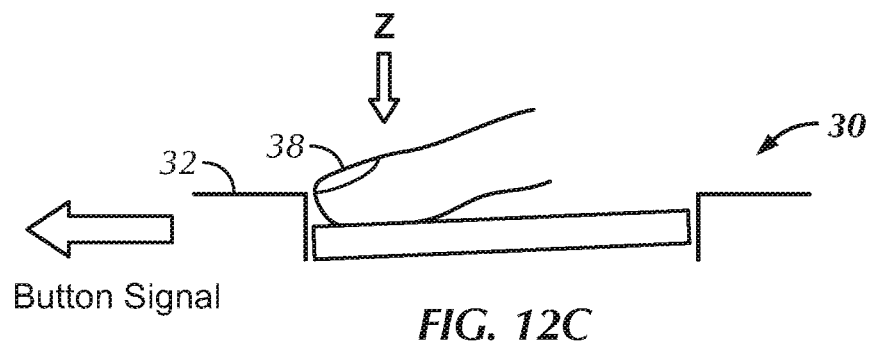

In the illustrated embodiment, track pad 34 takes the form of a depressible button that performs a "picking" action. That is, a portion of the entire track pad 34 acts like a single or multiple button such that one or more additional button functions may be implemented by pressing on track pad 34 rather than tapping on the track pad or using a separate button/separate zone. As shown in FIGS. 12A and 12B, according to one embodiment of the invention, track pad 34 is capable of moving between an upright (or neutral) position (FIG. 12A) and a depressed (or activate) position (FIG. 12B) when a force from a finger 38, palm, hand, or other object is applied to the track pad 34. The force should not be so small as to allow for accidental activation of the button signal, but not so large as to cause user discomfort by requiring undue pressure. Track pad 34 is typically biased in the upright position as for example through a flexure hinge, a spring member, or magnets. Track pad 34 moves to the activate position when the bias is overcome by an object pressing on track pad 34. As shown in FIG. 12C, the track pad 34 may be pivoted at one end such that the activate position is slightly inclined with respect to the neutral position. When the finger (or other object) is removed from track pad 34, the biasing member urges it back towards the neutral position. A shim or other structure (not shown) may prevent track pad 34 from overshooting the neutral position as it returns. For example, a portion of frame 32 may extend outwardly above a portion of track pad 34 so as to stop track pad 34 at the neutral position. In this way, the track pad surface can be kept flush with frame 32 if desired. For example, in laptop computers or handheld media devices, it may be desirable to have the track pad flush with the housing of the computer or device.

Figure 12D:
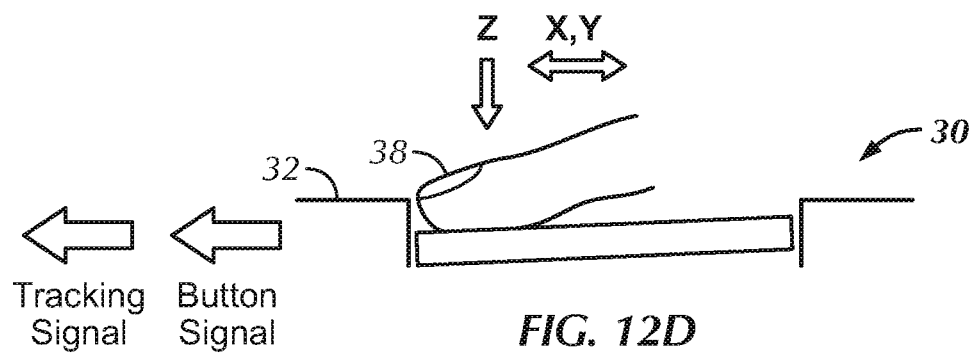

As shown in FIG. 12A, in the upright/neutral position, track pad 34 generates tracking signals when an object such as a user's finger is moved over the top surface of the touch pad in the x,y plane. Although FIG. 12A depicts the neutral position as being upright, the neutral position may be situated at any orientation. As shown in FIG. 12B, in the depressed position (z direction), track pad 34 generates one or more button signals. The button signals may be used for various functionalities including but not limited to making selections or issuing commands associated with operating an electronic device. By way of example, in the case of a music player, the button functions may be associated with opening a menu, playing a song, fast forwarding a song, seeking through a menu and the like. In the case of a laptop computer, the button functions can be associated with opening a menu, selecting text, selecting an icon, and the like. As shown in FIG. 12D, input device 30 may be arranged to provide both the tracking signals and the button signal at the same time, i.e., simultaneously depressing the touch pad 34 in the z direction while moving tangentially along the track surface (i.e., in the x, y directions). In other cases, input device 30 may be arranged to only provide a button signal when touch pad 34 is depressed and a tracking signal when the touch pad 34 is upright.

To elaborate, track pad 34 is configured to actuate one or more movement indicators, which are capable of generating the button signal when track pad 34 is moved to the activate position. The movement indicators are typically located within frame 32 and may be coupled to track pad 34 and/or frame 32. The movement indicators may be any combination of switches and sensors. Switches are generally configured to provide pulsed or binary data such as activate (on) or deactivate (off). By way of example, an underside portion of track pad 34 may be configured to contact or engage (and thus activate) a switch when the user presses on track pad 34. The sensors, on the other hand, are generally configured to provide continuous or analog data. By way of example, the sensor may be configured to measure the position or the amount of tilt of touch pad 34 relative to the frame when a user presses on the track pad 34. Any suitable mechanical, electrical and/or optical switch or sensor may be used. For example, tact switches, force sensitive resistors, pressure sensors, proximity sensors and the like may be used.

Track pads 10 and 30 shown in FIGS. 10-12 may, in some embodiments, be multi-touch trackpads. Multi-touch consists of a touch surface (screen, table, wall, etc.) or touchpad, as well as software that recognizes multiple simultaneous touch points, as opposed to the standard touchscreen (e.g., computer touchpad, ATM), which recognizes only one touch point. This effect is achieved through a variety of means, including but not limited to capacitive sensing, resistive sensing, surface acoustic wave sensing, heat, finger pressure, high capture rate cameras, infrared light, optic capture, tuned electromagnetic induction, and shadow capture. An example of a multi-touch mobile phone is the iPhone produced by Apple Inc. of Cupertino, Calif. An example of a multi-touch media device is the iPod Touch produced by Apple Inc. Examples of laptop computers having multi-touch track pads are the MacBook Air and MacBook Pro produced by Apple Inc. All of the input devices described herein may employ multi-touch technology in some embodiments; alternatively the input devices described herein may employ single touch track pads.

Figure 13:
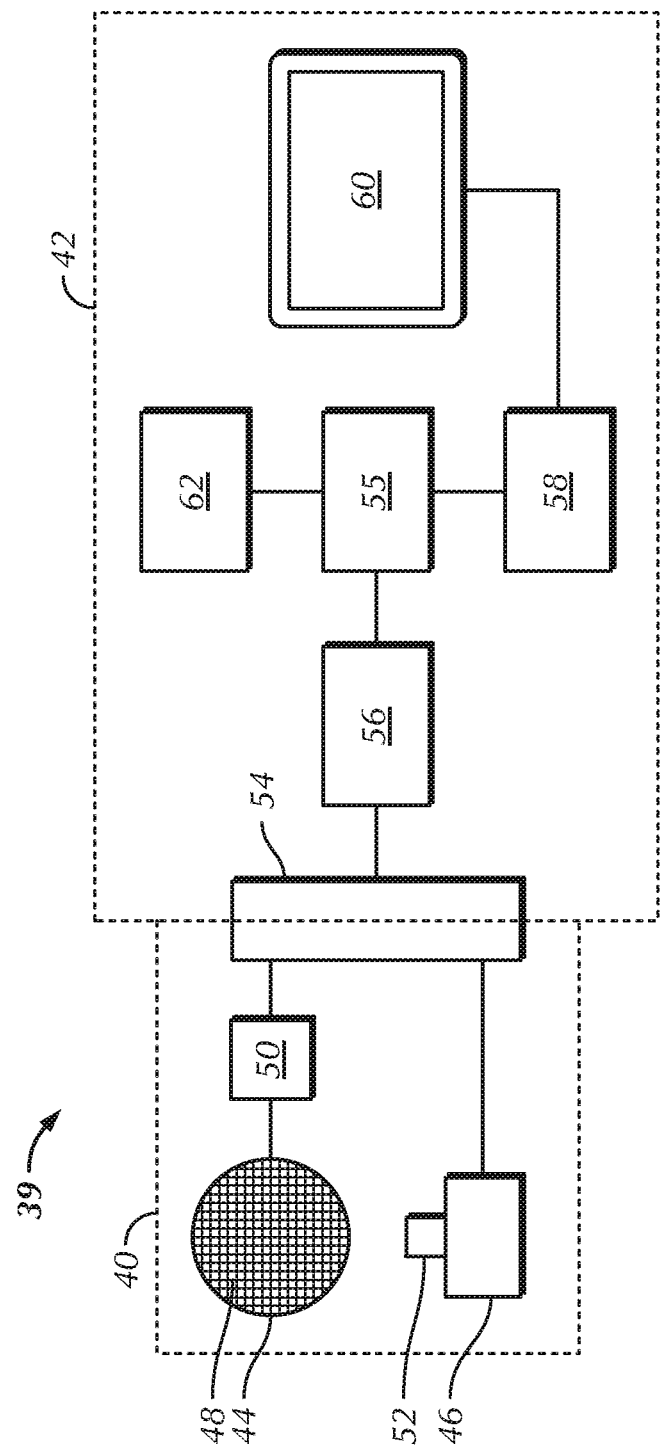
FIG. 13 is a simplified block diagram of an exemplary input device connected to a computing device according to one embodiment of this invention.

FIG. 13 is a simplified block diagram of a computing system 39, in accordance with one embodiment of the present invention. The computing system generally includes an input device 40 operatively connected to a computing device 42. By way of example, the input device 40 may generally correspond to the input device 30 shown in FIGS. 11 and 12, and the computing device 42 may correspond to a laptop computer, desktop computer, PDA, media player, mobile phone, smart phone, video game or the like. As shown, input device 40 includes a depressible track pad 44 and one or more movement indicators 46. Track pad 44 is configured to generate tracking signals and movement indicator 46 is configured to generate a button signal when the track pad 44 is depressed. Although track pad 44 may be widely varied, in this embodiment, track pad 44 includes capacitance sensors 48 and a control system 50 for acquiring the position signals from sensors 48 and supplying the signals to computing device 42. Control system 50 may include an application specific integrated circuit (ASIC) that is configured to monitor the signals from sensors 48, to compute the location (Cartesian or angular), direction, speed and acceleration of the monitored signals and to report this information to a processor of computing device 42. Movement indicator 46 may also be widely varied. In this embodiment, however, movement indicator 46 takes the form of a switch that generates a button signal when track pad 44 is depressed. Switch 46 may correspond to a mechanical, electrical or optical style switch. In one particular implementation, switch 46 is a mechanical style switch that includes a protruding actuator 52 that may be pushed by track pad 44 to generate the button signal. By way of example, the switch may be a tact switch or tactile dome.

Both track pad 44 and switch 46 are operatively coupled to computing device 42 through a communication interface 54. The communication interface provides a connection point for direct or indirect connection between the input device and the electronic device. Communication interface 54 may be wired (wires, cables, connectors) or wireless (e.g., transmitter/receiver).

Computing device 42 generally includes a processor 55 (e.g., CPU or microprocessor) configured to execute instructions and to carry out operations associated with the computing device 42. For example, using instructions retrieved for example from memory, the processor may control the reception and manipulation of input and output data between components of the computing device 42. In most cases, processor 55 executes instruction under the control of an operating system or other software. Processor 55 can be a single-chip processor or can be implemented with multiple components.

Computing device 42 also includes an input/output (I/O) controller 56 that is operatively coupled to processor 55. I/O controller 56 may be integrated with processor 55 or it may be a separate component, as shown. I/O controller 56 is generally configured to control interactions with one or more I/O devices that can be coupled to computing device 42, for example, input device 40. I/O controller 56 generally operates by exchanging data between computing device 42 and I/O devices that desire to communicate with computing device 42.

Computing device 42 also includes a display controller 58 that is operatively coupled to processor 55. Display controller 58 may be integrated with processor 55 or it may be a separate component, as shown. Display controller 58 is configured to process display commands to produce text and graphics on a display screen 60. By way of example, display screen 60 may be a monochrome display, color graphics adapter (CGA) display, enhanced graphics adapter (EGA) display, variable-graphics-array (VGA) display, super VGA display, liquid crystal display (LCD) (e.g., active matrix, passive matrix and the like), cathode ray tube (CRT), plasma displays, backlit light-emitting diode (LED) LCD displays, or the like.

In one embodiment (not shown), track pad 44 can comprise a glass surface functioning not only as a touch-sensitive surface, but also as a display screen; in this case display screen 60 shown in FIG. 13 would be integrated with the glass surface of the track pad 44. This could be useful in computing devices (e.g., media players or mobile phones) having touch sensitive displays. An example of a media player having a touch sensitive display is the iPod Touch produced by Apple Inc. of Cupertino Calif. An example of a mobile phone having a touch sensitive display is the iPhone produced by Apple Inc. of Cupertino Calif.

In most cases, processor 55 together with an operating system operates to execute computer code and produce and use data. The computer code and data may reside within a program storage area 62 that is operatively coupled to processor 55. Program storage area 62 generally provides a place to hold data that is being used by computing device 42. By way of example, the program storage area may include Read-Only Memory (ROM), Random-Access Memory (RAM), hard disk drive and/or the like. The computer code and data could also reside on a removable program medium and loaded or installed onto the computing device when needed. In one embodiment, program storage area 62 is configured to store information for controlling how the tracking and button signals generated by input device 40 are used by computing device 42.

Figure 14:
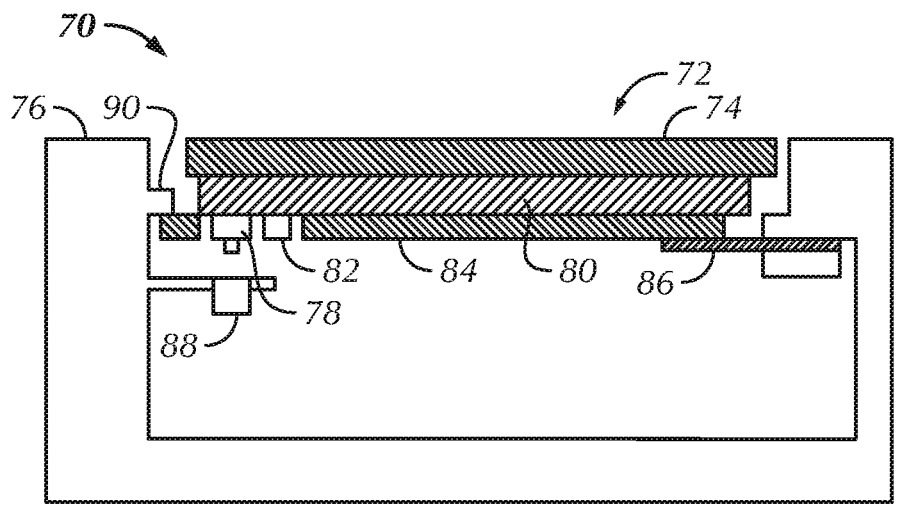
FIG. 14 is a side view, in cross section, of an exemplary input device according to one embodiment of this invention.
Figure 15:
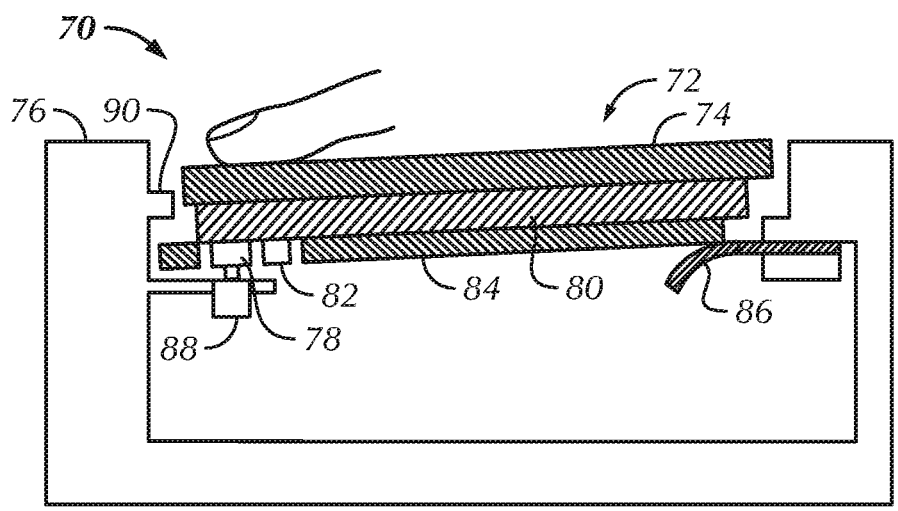
FIG. 15 is another side view, in cross section, of the exemplary input device of FIG. 12 according to one embodiment of this invention.

FIG. 14 shows one embodiment of an input device, generally shown at 70, comprising a track pad 72 connected to a frame 76. Frame 76 may be a housing for a stand alone input device, or it may be a casing for another device which incorporates track pad 72, for example a laptop computer, desktop computer, hand held media device, PDA, mobile phone, smart phone, etc. Track pad 72 includes various layers including an outer touch-sensitive track surface 74 for tracking finger movements. Track surface 74 may also provide a low friction cosmetic surface. In one embodiment, track pad 72 is based on capacitive sensing; therefore, it includes an electrode layer 80, which, for example, may be implemented on a PCB. In the case of capacitive sensing, track surface 74 is a dielectric material. A stiffener 84 is located below electrode layer 80. Stiffener 84 is shown in FIG. 14 and FIG. 15, but in some embodiments may be omitted. Stiffener 84 may be used to compensate for the inherent flexibility of electrode layer 80. Electrode layer 80 responds to finger movements along to track surface 74 by sending signals to sensor 82. In the case of capacitive sensing, electrode layer 80 registers changes in capacitance based on finger movements and sensor 82 is a capacitive sensor. In this way, track pad 72 incorporates a touch sensor arrangement. Sensor 82 is shown disposed on the bottom of electrode layer 80, but it may be located elsewhere in other embodiments. If, as in the illustrated embodiment, sensor 82 is located on a movable part of track pad 72, the input device may incorporate a flexible electrical connection (not shown) capable of moving with the system.

A movement indicator 78 is disposed on the bottom of track pad 72. Movement indicator 78 may be widely varied, however, in this embodiment it takes the form of a mechanical switch, which is typically disposed between the track pad 72 and the frame 76. In other embodiments, movement indicator 78 may be a sensor, for example an electrical sensor. Movement indicator 78 may be attached to frame 76 or to track pad 72. In the illustrated embodiment, movement indicator 78 is attached to the bottom side of electrode layer 80. By way of example, if electrode layer 80 is located on a PCB, movement indicator 78 may be located on the bottom of the PCB. In another example, movement indicator 78 may tack the form of a tact switches and more particularly, may be an SMT dome switches (dome switch packaged for SMT).

Track pad 72 is shown in its neutral position in FIG. 14, where movement sensor 78 is not in contact with frame 76. When a user applies a downward pressure to track surface 74, track pad 72 may move downward causing movement sensor 78 to register this change in position. In the illustrated embodiment, movement sensor 78 (a tact switch) would contact either frame 76, or in this case set screw 88. Set screw 88 may be manually adjusted to alter the distance between the neutral and activate positions. In one embodiment (not shown), set screw 88 may directly abut movement sensor 78 in the neutral position, such that there is no slack or pre-travel in the system. A flexure hinge 86 connects track pad 72 with frame 76. Flexure hinge 86 is a resilient material that flexes when a force is applied, but exerts a restoring force so as to urge track pad 72 back towards the neutral position. In one embodiment, flexure hinge 86 may be thin spring steel.

As shown in FIG. 15, flexure hinge 86 will flex when a user pushes down on track surface 74. Flexure 86 also urges track pad 72 towards its neutral position, which in the illustrated embodiment shown in FIG. 14 is horizontal. In this way, a user can press down virtually anywhere on track surface 74 and cause a "pick," meaning that movement indicator 78 will register this depression. This is in contrast to prior track pads which incorporate separate track zones and pick zones. Being able to pick anywhere on track surface 74 will provide the user with a more intuitive and pleasurable interface. For example, a user may be able to generate tracking and button signals with a single finger without ever having to remove the finger from track surface 74. In contrast, a user operating a track pad with separate track and pick zones may, for example, use a right hand for tracking and a left hand for picking, or a forefinger for tracking and thumb picking.

A shoulder 90, which may be an extension of frame 76 or a discrete member, blocks track pad 72 from travelling past its neutral position by contacting a part of track pad 72, for example stiffener 84. In this way, track surface 74 may be kept substantially flush with a top surface of frame 76. There may be a shock absorber or upstop (not shown) incorporated in conjunction with shoulder 90 to cushion contacts between track pad 72 and shoulder 90.

As should be appreciated, the pick generated by pressing on track surface 74 may include selecting an item on the screen, opening a file or document, executing instructions, starting a program, viewing a menu, and/or the like. The button functions may also include functions that make it easier to navigate through the electronic system, as for example, zoom, scroll, open different menus, home the input pointer, perform keyboard related actions such as enter, delete, insert, page up/down, and the like.

Flexure hinge 86 allows for a movable track pad in the minimum vertical space possible. Minimum vertical space is achieved because flexure hinge 86 is thin and is generally situated parallel to a bottom layer of track pad 72; consequently, flexure hinge 86 does not appreciably add to the thickness of track pad 72. Therefore, this arrangement is feasible for use in ultrathin laptop computers. In such ultrathin laptop computer applications, vertical space is extremely limited. In the past, the size of electrical components was often the limiting feature as to how small electrical devices could be made. Today, electrical components are increasingly miniaturized, meaning that mechanical components (e.g., movable track pads) may now be the critical size-limiting components. With this understanding, it is easy to appreciate why linear-actuation (e.g., supporting a movable track pad by coil springs or the like) is not ideal in some applications. Furthermore, using springs may add unnecessary complexity (increased part count, higher cost, higher failure rates, etc. . . . ) to the manufacturing process. Another disadvantage of springs is that in some embodiments springs may mask or compromise the tactile switch force profile. In contrast, flexure 86 can deliver a substantially consistent feel across the track surface 74, and give the user a more faithful representation of the tactile switch force profile.

Referring now to FIG. 15, according to one embodiment of the present invention, when a user presses on track surface 74 of track pad 72, track pad 72 pivots downwardly activates switch 78 disposed underneath. When activated, switch 78 generates button signals that may be used by an electronic device connected to input device 70. Flexure 86 can constrain track pad 72 to move substantially about only one axis. This can be accomplished by, for example, using multiple flexures arranged along an axis on one side of track pad 72, such as the rear side. Furthermore, if track pad 72 is made stiff (for example, by inclusion of stiffener 84 if necessary), a leveling architecture is achieved. In other words, flexure hinge 86 urges track pad 72 towards its neutral position and also permits movement about substantially only one axis, i.e., the axis along which flexure hinge 86 is connected to frame 76.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A method for selectively rejecting contacts on a touch sensor panel, comprising:
    designating one or more regions along one or more edges of the touch sensor panel as contact rejection regions, the one or more contact rejection regions located along an outer boundary of the touch sensor panel and having contact rejection criteria different from other regions of the touch sensor panel;
    detecting a first contact within the one or more contact rejection regions;
    determining any movement of the first contact; and
    ignoring the first contact when a centroid of the first contact moves less than a threshold amount from a computed centroid center.

2. The method of claim 1, further comprising ignoring the first contact unless a difference between an instantaneous position of a computed centroid of the first contact and a low pass filter averaged position value exceeds the particular movement threshold.

3. The method of claim 1, further comprising:
    detecting a second contact within a main region of the touch sensor panel; and
    recognizing the first and second contacts as part of a gesture when movement of the second contact tracks the movement of the first contact.

4. The method of claim 1, further comprising:
    detecting a second contact within a main region of the touch sensor panel; and
    recognizing the first and second contacts as part of a gesture when movement of the second contact is synchronized with the movement of the first contact.

5. An apparatus for selectively rejecting contacts on a touch sensor panel, comprising:
    a touch sensor panel capable of having one or more regions along one or more edges of the touch sensor panel designated as contact rejection regions, the one or more contact rejection regions located along an outer boundary of the touch sensor panel and having contact rejection criteria different from other regions of the touch sensor panel;
    a processor communicatively coupled to the touch sensor panel and capable of
        detecting a first contact within the one or more contact rejection regions,
        determining any movement of the first contact, and
        ignoring the first contact when a centroid of the first contact moves less than a threshold amount from a computed centroid center.

6. The apparatus of claim 5, the processor further capable of ignoring the first contact unless a difference between an instantaneous position of a computed centroid of the first contact and a low pass filter averaged position value exceeds the particular speed threshold.

7. The apparatus of claim 5, the processor further capable of:
    detecting a second contact within a main region of the touch sensor panel; and
    recognizing the first and second contacts as part of a gesture when movement of the second contact tracks the movement of the first contact.

8. The apparatus of claim 5, the processor further capable of:
    detecting a second contact within a main region of the touch sensor panel; and
    recognizing the first and second contacts as part of a gesture when movement of the second contact is synchronized with the movement of the first contact.

9. A non-transitory computer readable storage medium storing instructions, which when executed by one or more processors, cause the one or more processors to perform a method for selectively rejecting contacts on a touch sensor panel, comprising:
    designating one or more regions along one or more edges of the touch sensor panel as contact rejection regions, the one or more contact rejection regions located along an outer boundary of the touch sensor panel and having contact rejection criteria different from other regions of the touch sensor panel;
    detecting a first contact within the one or more contact rejection regions;
    determining any movement of the first contact; and
    ignoring the first contact when a centroid of the first contact moves less than a threshold amount from a computed centroid center.

10. The non-transitory computer readable storage medium of claim 9, the method further comprising ignoring the first contact unless a difference between an instantaneous position of a computed centroid of the first contact and a low pass filter averaged position value exceeds the particular movement threshold.

11. The non-transitory computer readable storage medium of claim 9, the method further comprising:
    detecting a second contact within a main region of the touch sensor panel; and
    recognizing the first and second contacts as part of a gesture when movement of the second contact tracks the movement of the first contact.

12. The non-transitory computer readable storage medium of claim 9, the method further comprising:
    detecting a second contact within a main region of the touch sensor panel; and
    recognizing the first and second contacts as part of a gesture when movement of the second contact is synchronized with the movement of the first contact.

* * * * *